(12) United States Patent
Kimura et al.

(10) Patent No.: US 8,967,867 B2
(45) Date of Patent: Mar. 3, 2015

(54) MOTOR AND FAN

(75) Inventors: Akihiro Kimura, Kyoto (JP); Teiichi Hirono, Kyoto (JP); Ryota Ogino, Kyoto (JP); Kyoko Horise, Kyoko (JP); Hiroyoshi Teshima, Kyoto (JP); Masashi Hirayama, Kyoto (JP)

(73) Assignee: Nidec Corporation, Kyoto-shi (JP)

( * ) Notice: Subject to any disclaimer, the term of this patent is extended or adjusted under 35 U.S.C. 154(b) by 337 days.

(21) Appl. No.: 13/477,772

(22) Filed: May 22, 2012

(65) Prior Publication Data
US 2013/0101450 A1 Apr. 25, 2013

(30) Foreign Application Priority Data
Oct. 24, 2011 (JP) ................. 2011-232944

(51) Int. Cl.
| | | |
|---|---|---|
| F16C 32/06 | (2006.01) | |
| F04D 25/06 | (2006.01) | |
| H02K 5/167 | (2006.01) | |
| H02K 7/08 | (2006.01) | |
| F04D 29/051 | (2006.01) | |
| F16C 33/74 | (2006.01) | |
| F16C 17/10 | (2006.01) | |

(52) U.S. Cl.
CPC .......... *F04D 25/0626* (2013.01); *H02K 5/1675* (2013.01); *H02K 7/085* (2013.01); *F04D 29/051* (2013.01); *F16C 33/745* (2013.01); *F04D 25/062* (2013.01); *F16C 17/107* (2013.01)
USPC ....................................... 384/107

(58) Field of Classification Search
USPC ......... 384/100, 107, 112, 114, 120, 121, 123; 310/90; 360/99.07, 99.08
See application file for complete search history.

(56) References Cited

U.S. PATENT DOCUMENTS

| | | | |
|---|---|---|---|
| 5,806,987 A | 9/1998 | Nose et al. | |
| 8,240,918 B2 * | 8/2012 | Bitou et al. | 384/100 |
| 2007/0177831 A1* | 8/2007 | Shibahara | 384/107 |
| 2007/0189648 A1 | 8/2007 | Kita et al. | |
| 2009/0196540 A1 | 8/2009 | Maruyama et al. | |
| 2010/0084932 A1 | 4/2010 | Li | |
| 2010/0315742 A1 | 12/2010 | Kimura et al. | |
| 2013/0336604 A1* | 12/2013 | Noda et al. | 384/107 |

FOREIGN PATENT DOCUMENTS

| | | |
|---|---|---|
| CN | 1914429 A | 2/2007 |
| CN | 101498339 A | 8/2009 |
| CN | 101922512 A | 12/2010 |
| JP | 9-210054 A | 8/1997 |

* cited by examiner

*Primary Examiner* — James Pilkington
(74) *Attorney, Agent, or Firm* — Westerman, Hattori, Daniels & Adrian, LLP

(57) ABSTRACT

A first seal portion having a surface of a lubricating oil defined therein is defined between a sleeve portion and a bearing housing. A side communicating channel arranged to bring a first seal gap and a thrust gap into communication with each other is defined either between a sleeve portion and a bearing housing or in an outer circumferential portion of a sleeve portion. A second seal portion having another surface of a lubricating oil defined therein is defined in a gap constituted by a side minute gap between a thrust plate and a bearing housing and a lower minute gap between a thrust plate and a cap member.

17 Claims, 21 Drawing Sheets

MOTOR AND FAN

BACKGROUND OF THE INVENTION

1. Field of the Invention

The present invention relates to an electric motor and a fan.

2. Description of the Related Art

Motors have been used as driving sources for a variety of electronic devices. A spindle motor of a hard disk drive disclosed in JP-A 9-210054 includes a rotor assembly and a stator assembly. The stator assembly includes a frame, a fixed shaft, and a ring-shaped thrust plate. The fixed shaft is arranged to stand upright in a central portion of the frame. The thrust plate is fixed to an upper portion of the fixed shaft. Thrust dynamic pressure bearing portions are defined in both axial end surfaces of the thrust plate. The rotor assembly includes a hub, a cylindrical radial dynamic pressure bearing portion, and a thrust support plate. The radial dynamic pressure bearing portion is arranged in a central portion of the hub. The fixed shaft is inserted in the radial dynamic pressure bearing portion. The thrust plate is arranged on an upper side of the radial dynamic pressure bearing portion. The thrust support plate is screwed onto the hub on an upper side of the thrust plate.

During rotation of the hub, the hub is supported in a radial direction through a dynamic pressure generated by a lubricant in a gap defined between the radial dynamic pressure bearing portion and the fixed shaft. In addition, the hub is supported in an axial direction through dynamic pressures generated by the lubricant in a gap defined between the thrust plate and the radial dynamic pressure bearing portion, and a gap defined between the thrust plate and the thrust support plate. Capillary seal portions are defined in a lower portion of the gap defined between the radial dynamic pressure bearing portion and the fixed shaft, and a gap defined between the fixed shaft and the thrust support plate.

SUMMARY OF THE INVENTION

In the motor disclosed in JP-A 9-210054, the radial dynamic pressure bearing portion and the thrust dynamic pressure bearing portions are arranged between the two capillary seal portions, and therefore, a difference in pressure between the two capillary seal portions tends to easily occur during drive of the motor. If such a pressure difference occurs, surfaces of the lubricant fluctuate, and the lubricant may leak out through one of the two capillary seal portions. In order to prevent a leakage of the lubricant through any capillary seal portion, it is necessary to assemble components of the motor with high accuracy. In the case of a motor which includes a thrust dynamic pressure bearing portion and in which a surface of a lubricating oil is arranged in the vicinity of a thrust member, surfaces of the lubricating oil tend to fluctuate so greatly that it may be difficult to prevent a leakage of the lubricating oil.

The present invention has been conceived to easily prevent a leakage of a lubricating oil in a motor in which a surface of the lubricating oil is arranged in the vicinity of a thrust member.

A motor according to a preferred embodiment of the present invention includes a stationary portion including a stator; a rotating portion including a rotor magnet arranged opposite to the stator; and a bearing mechanism arranged to support the rotating portion such that the rotating portion is rotatable with respect to the stationary portion. The bearing mechanism includes a shaft; a sleeve portion arranged to have the shaft inserted therein; a thrust plate fixed to the shaft on a lower side of the sleeve portion, and including an outer circumferential surface having a diameter greater than that of a bottom portion of the sleeve portion; a bearing housing arranged to surround the sleeve portion and the thrust plate; and a cap member fixed to the bearing housing on a lower side of the thrust plate, and axially opposed to at least an outer circumferential portion of the thrust plate. A radial dynamic pressure bearing portion arranged to support the shaft in a radial direction defined therein includes a radial gap defined between an inner circumferential surface of the sleeve portion and an outer circumferential surface of the shaft, while a thrust dynamic pressure bearing portion defined therein includes a thrust gap defined between a lower surface of the sleeve portion and an upper surface of the thrust plate. An outer circumferential surface of the sleeve portion and an inner circumferential surface of the bearing housing are arranged to together define a first seal gap therebetween, the first seal gap having a radial width gradually increasing with increasing height, the first seal gap including a first seal portion having a surface of a lubricating oil defined therein. A side communicating channel arranged to bring a bottom portion of the first seal gap and an outer edge portion of the thrust gap into communication with each other is defined on a lower side of the first seal portion and either between an outer circumferential portion of the sleeve portion and an inner circumferential portion of the bearing housing, or in the outer circumferential portion of the sleeve portion. The outer circumferential surface of the thrust plate and the inner circumferential surface of the bearing housing are arranged to together define a side minute gap therebetween, and a lower surface of the outer circumferential portion of the thrust plate and an upper surface of an outer circumferential portion of the cap member are arranged to together define a lower minute gap therebetween, the side minute gap and the lower minute gap together constituting a second seal gap, the second seal gap including a second seal portion having another surface of the lubricating oil defined therein.

The present invention makes it possible to easily prevent a leakage of a lubricating oil out of a motor.

DETAILED DESCRIPTION OF THE PREFERRED EMBODIMENTS

Figure 1:
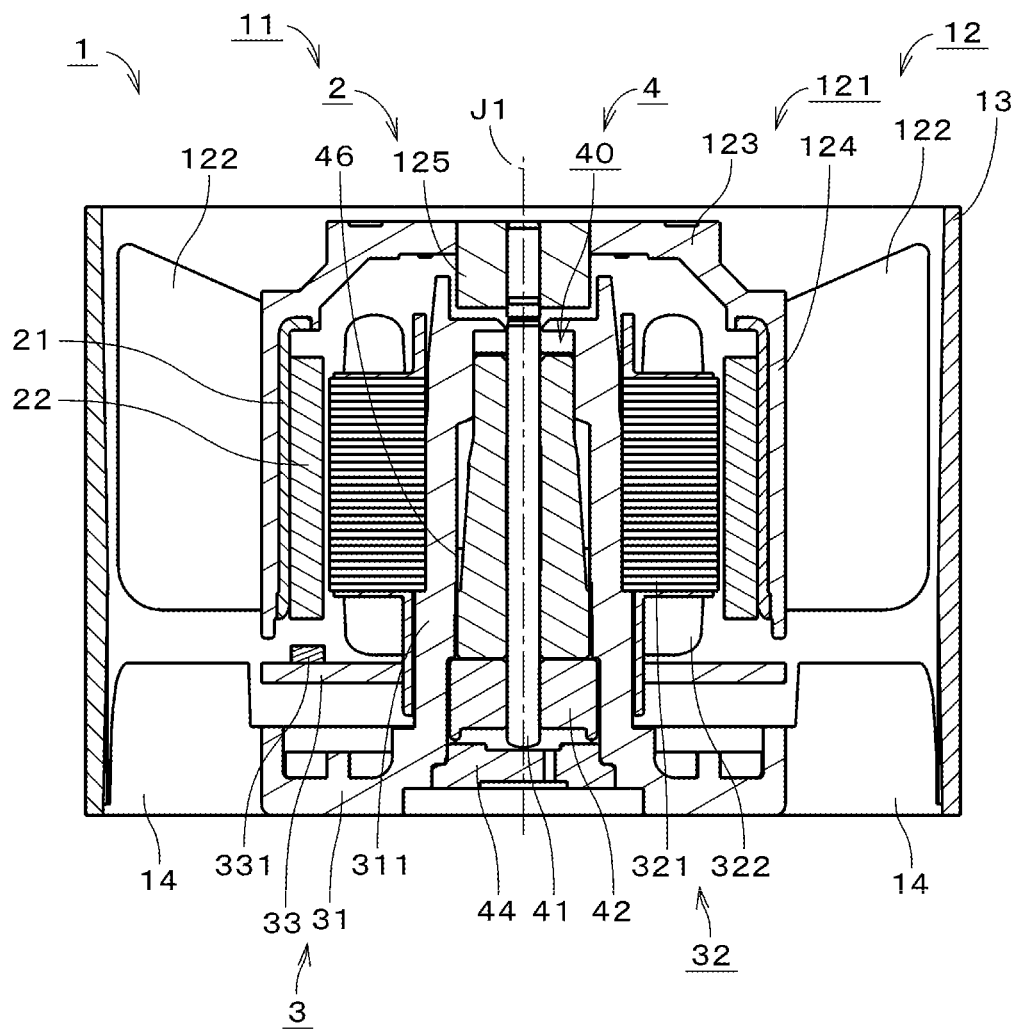
FIG. 1 is a cross-sectional view of a fan according to a first preferred embodiment of the present invention.

It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel to the central axis is referred to by the term "axial direction", "axial", or "axially", that directions perpendicular to the central axis are simply referred to by the term "radial direction", "radial", or "radially", and that a circumferential direction about the central axis is simply referred to by the term "circumferential direction", "circumferential", or "circumferentially".

First Preferred Embodiment

FIG. 1 is a cross-sectional view of an axial fan 1 according to a first preferred embodiment of the present invention. Hereinafter, the axial fan 1 will be referred to simply as the "fan 1". The fan 1 includes a motor 11, an impeller 12, a housing 13, and a plurality of support ribs 14. The housing 13 is arranged to surround an outer circumference of the impeller 12. The support ribs 14 are arranged in a circumferential direction. The housing 13 and the motor 11 are connected to each other through the support ribs 14.

The impeller 12 is made of a resin, and includes a cup 121 and a plurality of blades 122. The cup 121 is substantially in the shape of a covered cylinder. The cup 121 is arranged to cover an outer side of the motor 11. The cup 121 is arranged to define a portion of a rotating portion 2 of the motor 11, which will be described below. The cup 121 includes a top plate portion 123, a side wall portion 124, and a tubular bushing 125. The top plate portion 123 is arranged to extend radially outward. The side wall portion 124 is arranged to extend downward from an outer edge portion of the top plate portion 123. The bushing 125 is fixed in a central hole of the top plate portion 123. The blades 122 are arranged to extend radially outward from an outer circumferential surface of the side wall portion 124 with a central axis J1 as a center. The cup 121 and the blades 122 are defined integrally with each other by a resin injection molding process. Note that the cup 121 may be made up of the top plate portion 123 and the side wall portion 124 without including the bushing 125.

The fan 1 is arranged to produce air currents traveling downward from above through rotation of the impeller 12 about the central axis J1 caused by the motor 11.

The motor 11 is an outer-rotor three-phase motor. The motor 11 includes the rotating portion 2, a stationary portion 3, and a bearing mechanism 4. The rotating portion 2 is supported by the bearing mechanism 4 such that the rotating portion 2 is rotatable with respect to the stationary portion 3. The rotating portion 2 includes a substantially cylindrical metallic yoke 21, a rotor magnet 22, and the cup 121. The yoke 21 is fixed to an inside of the cup 121. The rotor magnet 22 is fixed to an inner circumferential surface of the yoke 21.

The stationary portion 3 includes a base portion 31, a stator 32, and a circuit board 33. The base portion 31 includes a bearing housing 311 arranged in a central portion thereof and arranged to extend upward. The bearing housing 311 is arranged to define a portion of the bearing mechanism 4. The base portion 31 and the support ribs 14 are defined integrally with each other. The stator 32 is fixed to an outer circumferential surface of the bearing housing 311. The stator 32 is arranged radially inward of the rotor magnet 22. The stator 32 includes a stator core 321 and a plurality of coils 322 arranged on the stator core 321. The stator core 321 is defined by laminated steel sheets. The circuit board 33 is fixed below the stator 32. Lead wires from the coils 322 are attached to pins (not shown) inserted in holes defined in the circuit board 33, so that the stator 32 and the circuit board 33 are electrically connected with each other. Note that the lead wires from the coils 322 may be directly connected to the circuit board 33. During drive of the motor 11, a turning force is generated between the rotor magnet 22 and the stator 32, which is arranged radially opposite the rotor magnet 22.

A Hall element 331 and a drive circuit (not shown) are mounted on an upper surface of the circuit board 33. The Hall element 331 is arranged under the rotor magnet 22 to detect changes in magnetic flux which accompany rotation of the rotor magnet 22. The directions of currents supplied to the coils 322 are switched through the drive circuit in accordance with voltages outputted with the changes in the magnetic flux.

The bearing mechanism 4 includes a shaft 41, a sleeve portion 40, an annular thrust plate 42, the bearing housing 311, and a thrust cap 44, which corresponds to a cap member. Each of the shaft 41 and the thrust plate 42 is arranged to define a portion of the rotating portion 2. Each of the sleeve portion 40, the thrust cap 44, and the bearing housing 311 is arranged to define a portion of the stationary portion 3. The shaft 41 is inserted in the sleeve portion 40. A top portion of the shaft 41 is fixed to the bushing 125, which is arranged at a center of the top plate portion 123. The sleeve portion 40 and the thrust plate 42 are enclosed by the bearing housing 311.

Figure 2:
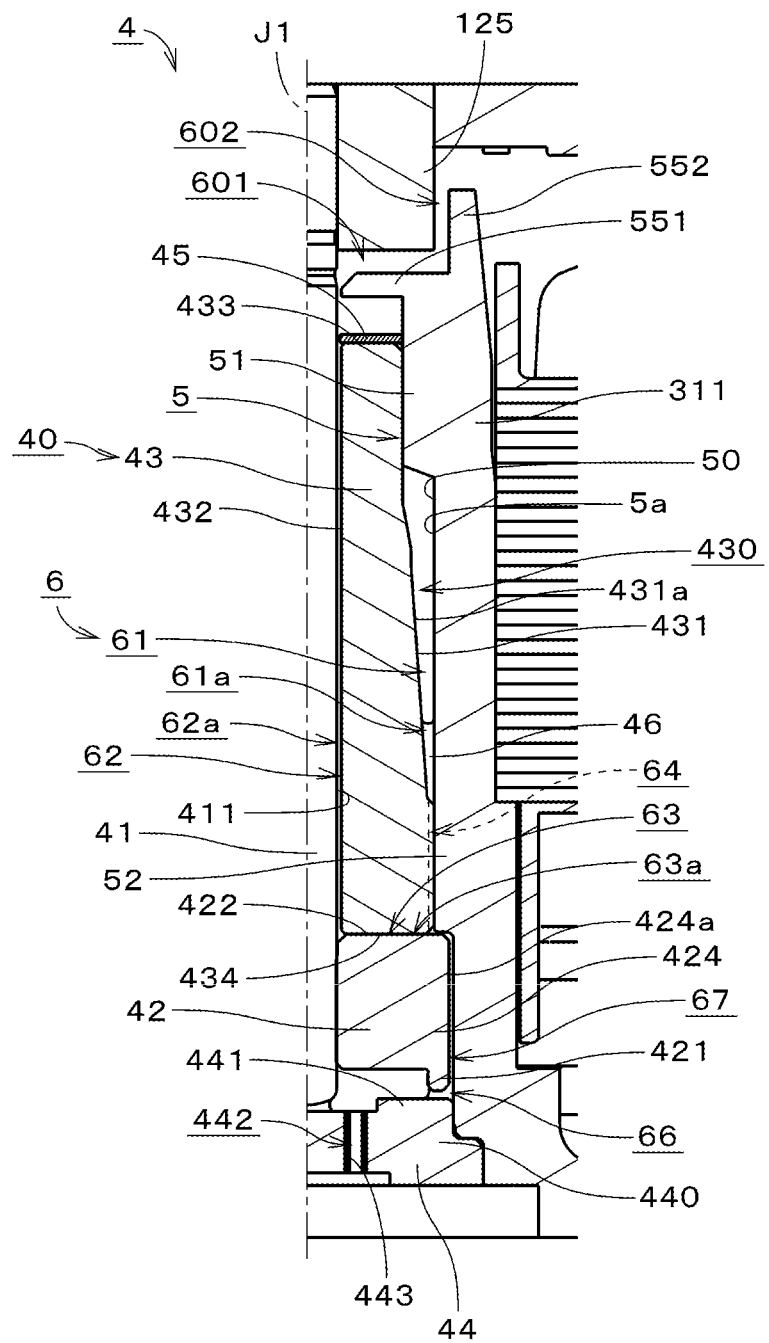
FIG. 2 is a vertical cross-sectional view of a bearing mechanism according to the first preferred embodiment.

FIG. 2 is a cross-sectional view illustrating the bearing mechanism 4 in an enlarged form. The thrust plate 42 is made of high-strength brass. The thrust plate 42 is fixed to a lower portion of the shaft 41 on a lower side of the sleeve portion 40. An outer circumferential surface 424a of the thrust plate 42 is arranged to have a diameter greater than that of a bottom portion of the sleeve portion 40. An outer circumferential portion 424 of the thrust plate 42 includes an annular projecting portion 421 arranged to project downward toward the thrust cap 44. Hereinafter, the projecting portion 421 will be referred to as a "plate projecting portion 421". The sleeve portion 40 includes a sleeve 43 and an annular upper plate 45. The upper plate 45 is arranged on an upper surface 433 of the sleeve 43. The sleeve 43 is defined by a metallic sintered body impregnated with a lubricating oil. An outer circumferential surface 431 of the sleeve 43 includes an inclined surface 431a arranged to be inclined radially inward with increasing height.

A top portion of an outer circumferential portion 430 of the sleeve 43 is fixed to an inner circumferential portion 5 of the bearing housing 311 through press fit and adhesion. A bottom portion of the outer circumferential portion 430 is fixed to the inner circumferential portion 5 through press fit. Hereinafter, a portion of the inner circumferential portion 5 of the bearing housing 311 which is arranged to be in contact with a top portion of the sleeve 43 will be referred to as a "first contact portion 51", and a portion of the inner circumferential portion 5 of the bearing housing 311 which is arranged to be in contact with a bottom portion of the sleeve 43 will be referred to as a "second contact portion 52". A top portion of the bearing housing 311 includes an annular portion 551 and a cylindrical portion 552. The annular portion 551 is arranged to extend radially inward on an upper side of the first contact portion 51. The cylindrical portion 552 is arranged to extend upward from an outer edge of the annular portion 551.

The thrust cap 44 is fixed to the bearing housing 311 on a lower side of the thrust plate 42. The thrust plate 42 and the thrust cap 44 are arranged axially opposite each other. The thrust cap 44 is arranged to close a bottom portion of the bearing housing 311. The thrust cap 44 includes an annular projecting portion 441 and a through hole 442. The projecting portion 441 is defined in an outer circumferential portion 440 of the thrust cap 44, and arranged to project upward toward the thrust plate 42. Hereinafter, the projecting portion 441 will be referred to as a "cap projecting portion 441". The through hole 442 is defined radially inward of the cap projecting portion 441, and arranged to extend through the thrust cap 44 in the axial direction. An oil-repellent film 443 is arranged on an inner circumferential surface of the through hole 442.

In the bearing mechanism 4, a gap 61 is defined between the inclined surface 431a of the sleeve 43 and a portion 5a of an inner circumferential surface 50 of the bearing housing 311 which is below the first contact portion 51. The gap 61 is arranged to gradually increase in radial width with increasing height. Hereinafter, the gap 61 will be referred to as a "first seal gap 61". A first seal portion 61a is defined in the first seal gap 61. The first seal portion 61a is arranged to retain a lubricating oil 46 therein through capillary action. A surface of the lubricating oil 46 is arranged in the first seal portion 61a. A radial gap 62 extending in the axial direction is defined between an inner circumferential surface 432 of the sleeve 43 and an outer circumferential surface 411 of the shaft 41. A thrust gap 63 extending radially is defined between an upper surface 422 of the thrust plate 42 and a lower surface 434 of the sleeve 43.

Figure 3:
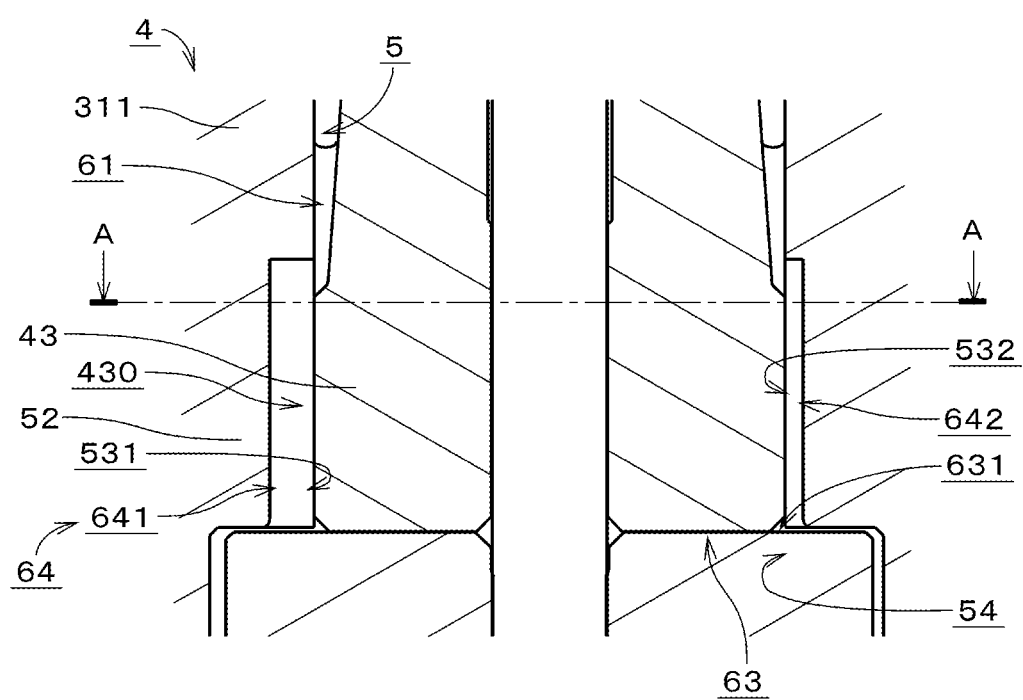
FIG. 3 is a vertical cross-sectional view of the bearing mechanism.
Figure 4:
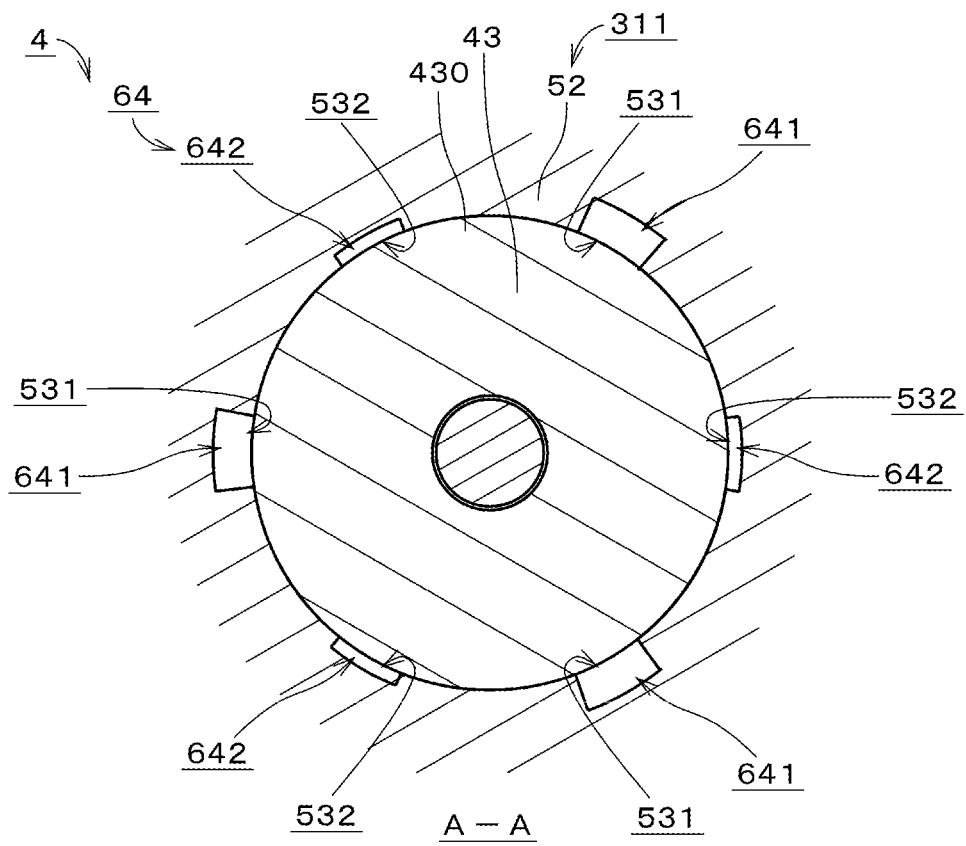
FIG. 4 is a horizontal cross-sectional view of the bearing mechanism.

FIG. 3 is a diagram illustrating a lower portion of the sleeve 43 and its vicinity in an enlarged form. FIG. 4 is a cross-sectional view of the bearing mechanism 4 taken along line A-A in FIG. 3. The second contact portion 52 of the bearing housing 311 includes a plurality of first groove portions 531 and a plurality of second groove portions 532. Each of the first and second groove portions 531 and 532 is arranged to extend in the axial direction on a lower side of the first seal gap 61. Each first groove portion 531 is arranged to have a radial width greater than that of each second groove portion 532. The bearing mechanism 4 includes first side communicating channels 641 and second side communicating channels 642 defined between the second contact portion 52 and the outer circumferential portion 430 of the sleeve 43. Each first side communicating channel 641 is defined by a separate one of the first groove portions 531 extending in the axial direction. Each second side communicating channel 642 is defined by a separate one of the second groove portions 532 extending in the axial direction. Each first side communicating channel 641 is arranged to have a radial width greater than that of each second side communicating channel 642. Hereinafter, the first and second side communicating channels 641 and 642 will be referred to collectively as "side communicating channels 64". As illustrated in FIG. 3, each side communicating channel 64 is arranged on the lower side of the first seal gap 61, and a bottom portion of the first seal gap 61 and an outer edge portion 631 of the thrust gap 63 are brought into communication with each other through the side communicating channels 64.

Figure 5:
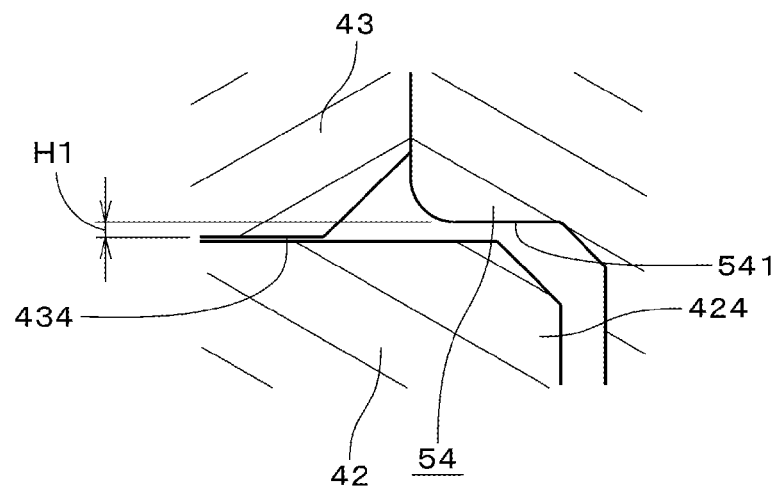
FIG. 5 is a vertical cross-sectional view of the bearing mechanism.

The inner circumferential portion 5 of the bearing housing 311 includes a shoulder portion 54 defined by an increase in the diameter thereof near bottom portions of the side communicating channels 64. Referring to FIG. 5, a lower surface 541 of the shoulder portion 54 is arranged at a level higher than that of the lower surface 434 of the sleeve 43. The axial distance H1 between the lower surface 541 of the shoulder portion 54 and the lower surface 434 of the sleeve 43 is arranged in the range of about 0 μm to about 300 μm when the motor 11 is in a stationary state. The outer circumferential portion 424 of the thrust plate 42 is arranged to overlap with the lower surface 541 of the shoulder portion 54 in the axial direction.

Figure 6:
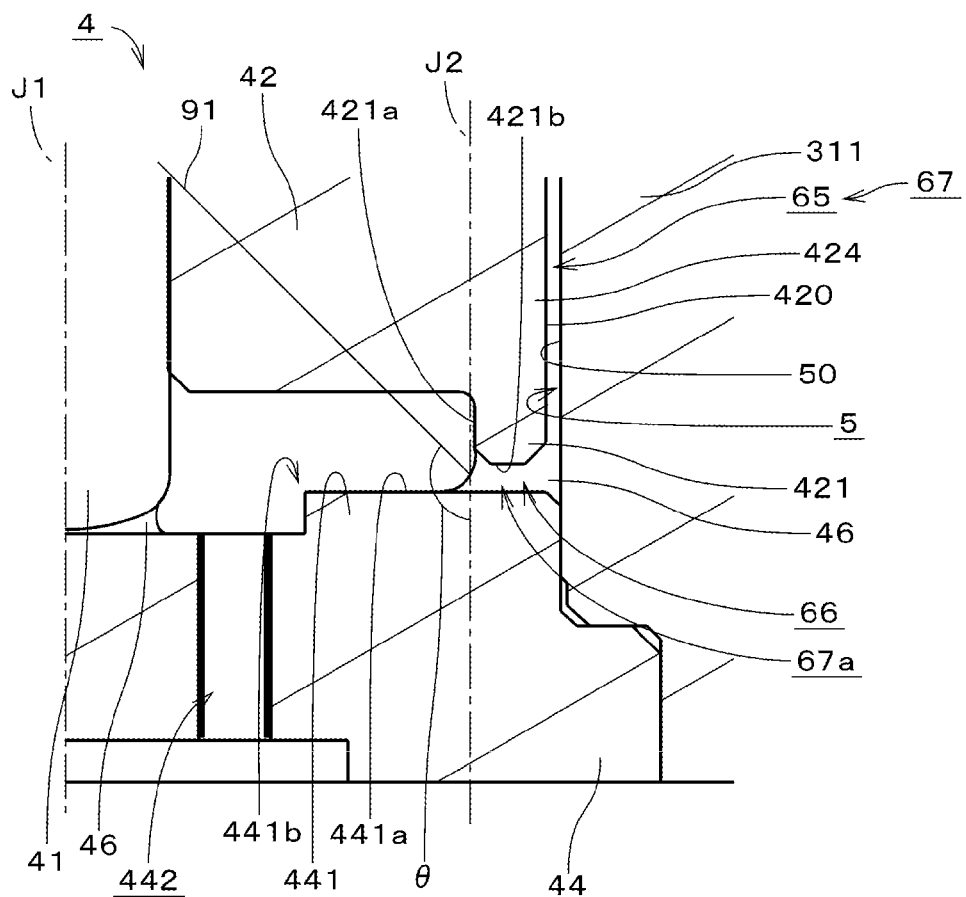
FIG. 6 is a vertical cross-sectional view of the bearing mechanism.

Referring to FIG. 6, the bearing mechanism 4 includes a minute gap 65 defined between an outer circumferential surface 420 of the thrust plate 42 and a lower portion of the inner circumferential surface 50 of the bearing housing 311. Hereinafter, the minute gap 65 will be referred to as a "side minute gap 65". A lower surface 421b of the plate projecting portion 421 and an upper surface 441a of the cap projecting portion 441 are arranged to together define a minute gap 66 therebetween. Hereinafter, the minute gap 66 will be referred to as a "lower minute gap 66". Referring to FIG. 2, the lower minute gap 66 and each side communicating channel 64 are arranged to overlap with each other in the axial direction.

Referring to FIG. 6, the bearing mechanism 4 includes a second seal portion 67a defined in the lower minute gap 66 to retain the lubricating oil 46 therein. A lower surface of the lubricating oil 46 is arranged in the second seal portion 67a. Note, however, that the lower surface of the lubricating oil 46 may be defined in the side minute gap 65 when the motor 11 is in the stationary state. In this case, if the outer circumferential surface 420 of the thrust plate 42 is arranged to include an inclined surface arranged to be inclined radially inward with decreasing height, the lower surface of the lubricating oil 46 is properly defined in the side minute gap 65. Hereinafter, the side minute gap 65 and the lower minute gap 66 will be referred to collectively as a "second seal gap 67". The through hole 442 defined in the thrust cap 44 serves to maintain the second seal portion 67a under atmospheric pressure. Referring to FIG. 6, regarding the second seal gap 67, an angle θ defined between a line 91 and a line J2 is arranged to be about 135 degrees. The angle θ is defined on a counterclockwise side of the line 91 in FIG. 6. The line 91 is a bisector of an angle defined between an inner circumferential surface 421a of the plate projecting portion 421 and the upper surface 441a of the cap projecting portion 441. The line J2 passes through an end opening of the lower minute gap 66 and extends in parallel with the central axis J1. The above arrangement enables the surface of the lubricating oil 46 defined at the end opening of the lower minute gap 66 to face obliquely upward toward the central axis J1.

Figure 7:
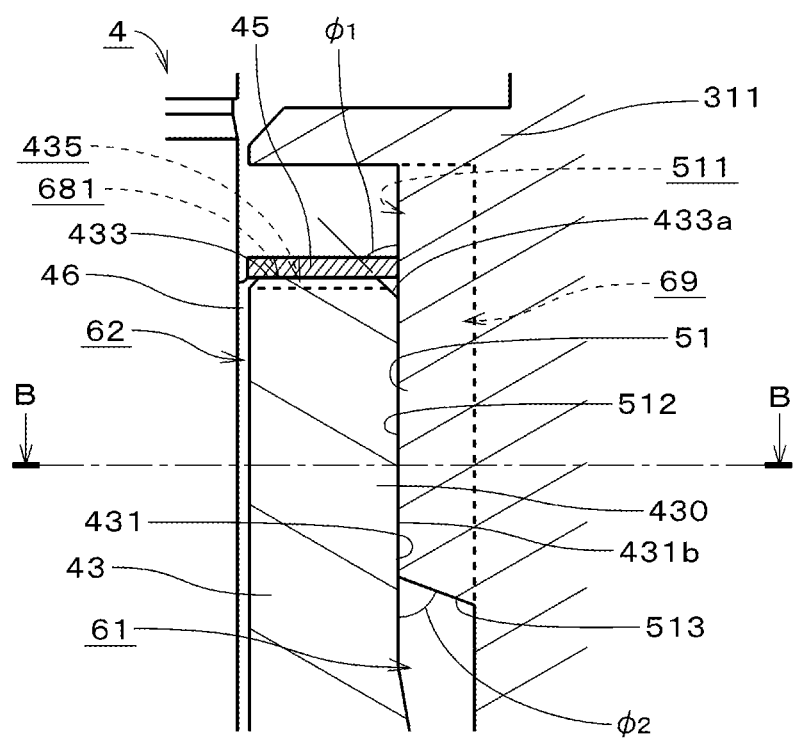
FIG. 7 is a vertical cross-sectional view of the bearing mechanism.

FIG. 7 is a cross-sectional view illustrating an upper portion of the sleeve 43 and its vicinity in an enlarged form. An upper surface of the sleeve 43 includes an upper-side groove portion 435 arranged to extend in the radial direction. A communicating channel 681 extending in the radial direction is defined between the upper-side groove portion 435 and the upper plate 45. Hereinafter, the communicating channel 681 will be referred to as an "upper communicating channel 681". The upper communicating channel 681 is arranged to bring the first seal gap 61 and the radial gap 62 into radial communication with each other. The upper communicating channel 681 serves to guide a portion of the lubricating oil 46 which soaks out of the top portion of the sleeve 43 into the radial gap 62, and also to prevent a leakage of the lubricating oil 46 through the top portion of the sleeve 43. Note that a portion of the lubricating oil 46 which is in the upper communicating channel 681 may sometimes flow toward the first seal gap 61. An upper surface of the lubricating oil 46 is defined above the radial gap 62.

Figure 8:
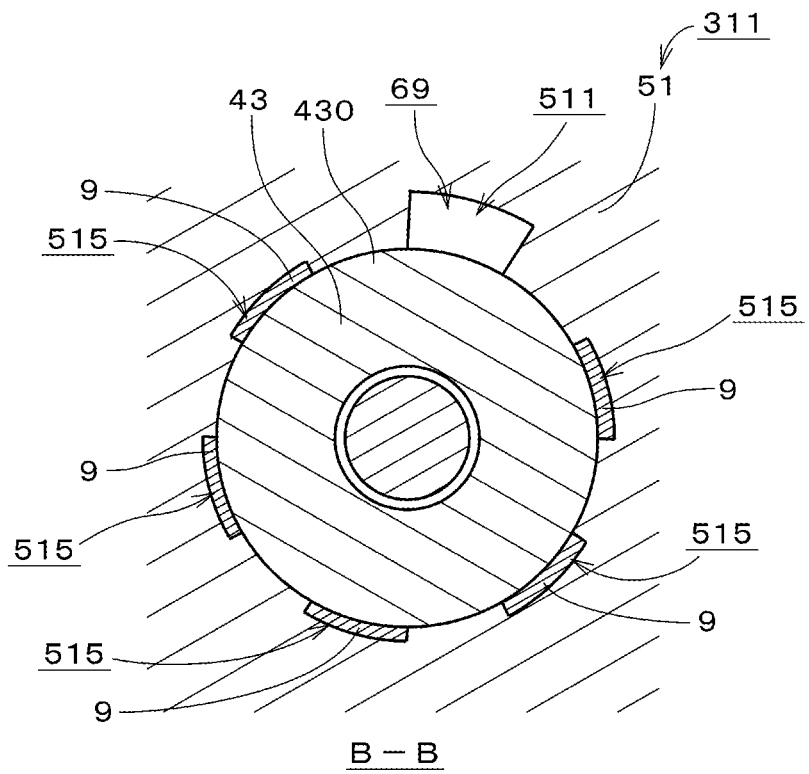
FIG. 8 is a horizontal cross-sectional view of the bearing mechanism.

The first contact portion 51 of the bearing housing 311 includes a cut portion 511 arranged to extend in the axial direction. FIG. 8 is a cross-sectional view of the bearing mechanism 4 taken along line B-B in FIG. 7. The cut portion 511 is arranged to define an airway 69 extending in the axial direction between the first contact portion 51 and the top portion of the outer circumferential portion 430 of the sleeve 43. Referring to FIG. 7, the first seal gap 61 and a space above the sleeve 43 are brought into communication with each other through the airway 69. This makes it possible to maintain the first seal gap 61 under atmospheric pressure, and also to prevent fluctuation of the position of the surface of the lubricating oil 46 in the first seal gap 61 due to thermal expansion of an air in the first seal gap 61.

Referring to FIG. 8, the first contact portion 51 includes a plurality of minute cut portions 515, each of which is arranged to have a radial width smaller than that of the cut portion 511. Each minute cut portion 515 is arranged to extend in the axial direction. Provision of the minute cut portions 515 contributes to preventing an excessive pressure of the bearing housing 311 against the sleeve 43 at the time of press fitting of the sleeve 43. Each minute cut portion 515 is closed with an adhesive 9.

Referring to FIG. 7, an angle $\phi_1$ defined between an inner circumferential surface 512 of the first contact portion 51 and a chamfer 433a defined in a radially outer edge of the upper surface 433 of the sleeve 43 is arranged to be 45 degrees or more, and an angle $\phi_2$ defined between a lower surface 513 of the first contact portion 51 and the outer circumferential surface 431 of the sleeve 43 is also arranged to be 45 degrees or more. As described above, every angle defined between the first contact portion 51 and the sleeve 43 at any contact point is arranged to be 45 degrees or more, and this contributes to preventing the lubricating oil 46 from staying in a gap defined between the first contact portion 51 and the top portion of the sleeve 43 through capillary action. The same holds true for other preferred embodiments of the present invention described below.

Referring to FIG. 2, the bushing 125 is arranged above the radial gap 62. A horizontal gap 601 arranged to extend radially outward is defined between a lower surface of the bushing 125 and an upper surface of the annular portion 551. A vertical gap 602 arranged to extend in the axial direction is defined between an outer circumferential surface of the bushing 125 and an inner circumferential surface of the cylindrical portion 552. The vertical gap 602 is annular in shape and centered on the central axis J1. The radial gap 62 is arranged to be in communication with an exterior space through the horizontal gap 601 and the vertical gap 602. Here, the exterior space refers to a space above the stator 32 illustrated in FIG. 1. Provision of the horizontal gap 601 and the vertical gap 602 contributes to preventing an air containing a vaporized lubricating oil from traveling out of the bearing mechanism 4. This contributes to preventing evaporation of the lubricating oil 46 in the bearing mechanism 4.

Figure 9:
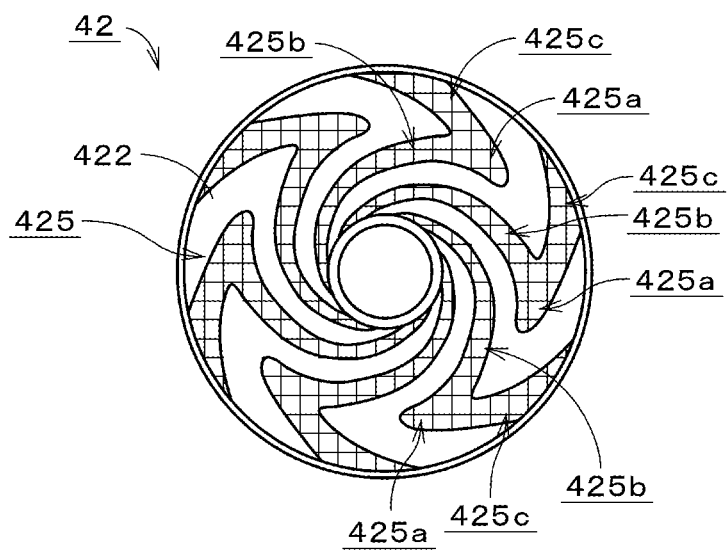
FIG. 9 is a plan view of a thrust plate according to the first preferred embodiment.

FIG. 9 is a plan view of the thrust plate 42. The upper surface 422 of the thrust plate 42 includes a thrust dynamic pressure groove array 425 arranged in a herringbone pattern defined therein. The thrust dynamic pressure groove array 425 is made up of a plurality of grooves each of which is substantially in the shape of the letter "V" and has a top portion 425a thereof oriented in the circumferential direction. Each of the grooves includes the top portion 425a and, on both sides thereof, a radially inner portion 425b and a radially outer portion 425c, respectively. The radially inner portion 425b is arranged to have a length greater than that of the radially outer portion 425c. In FIG. 9, the thrust dynamic pressure groove array 425 is indicated by cross-hatching. During the drive of the motor 11, a thrust dynamic pressure bearing portion 63a arranged to generate a thrust dynamic pressure acting on the lubricating oil 46 is defined in the thrust gap 63 illustrated in FIG. 2 through the thrust dynamic pressure groove array 425.

Figure 10:
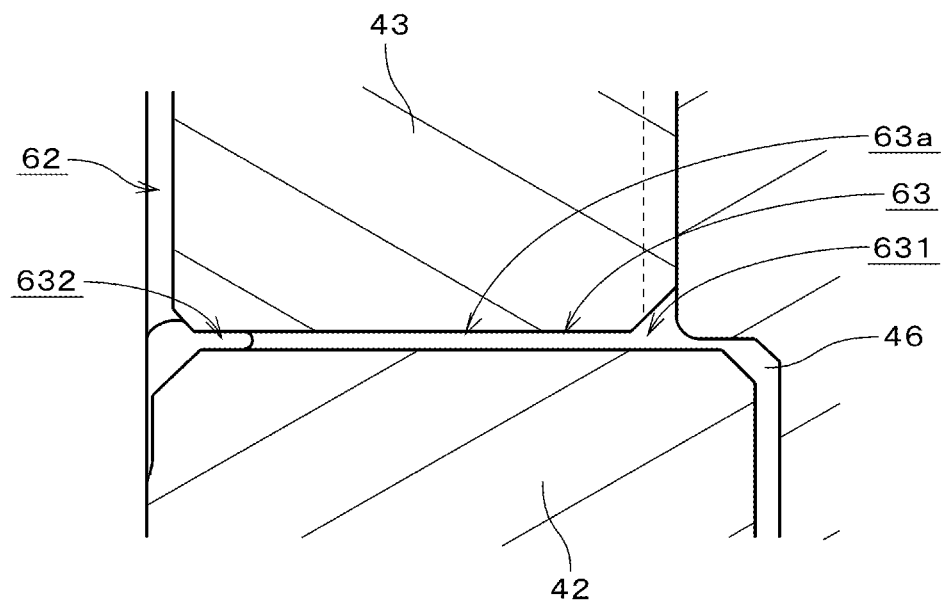
FIG. 10 is a vertical cross-sectional view of the bearing mechanism.

Referring to FIG. 10, in a situation in which the entire thrust gap 63 is filled with the lubricating oil 46, a strong radially outward pressure is generated on the lubricating oil 46. However, surfaces of the lubricating oil 46 may sometimes be defined between a bottom portion of the radial gap 62 and an inner edge portion 632 of the thrust gap 63, with the lubricating oil 46 gathered toward the outer edge portion 631 in the thrust gap 63. In this case, a pressure acting from the outer edge portion 631 toward the inner edge portion 632 of the thrust gap 63 and a pressure acting from the inner edge portion 632 toward the outer edge portion 631 are balanced with each other near the top portion 425a of each of the grooves constituting the thrust dynamic pressure groove array 425.

An increase in pressure in gaps around the thrust gap 63 due to the thrust dynamic pressure is less likely to occur in the bearing mechanism 4 than in the case where a dynamic pressure groove array in a spiral pattern is defined therein. It is therefore easy to design a structure to prevent a leakage of the lubricating oil 46 in the bearing mechanism 4. Provision of the thrust dynamic pressure bearing portion 63a contributes to preventing a contact between the sleeve 43 and the thrust plate 42 even when the viscosity of the lubricating oil 46 is decreased under a high temperature environment or when the fan 1 is used while being placed upside down.

In the fan 1, the rotating portion 2 is supported stably in the axial direction with respect to the stationary portion 3 through the thrust dynamic pressure bearing portion 63a. In addition, referring to FIG. 2, a radial dynamic pressure bearing portion 62a is defined through the lubricating oil 46 in the radial gap 62, whereby the shaft 41 is supported stably in the radial direction. Use of the bearing mechanism using fluid dynamic pressure in the fan 1 contributes to reducing a production cost of the fan 1 as compared to the case where a ball bearing is used therein.

Referring to FIG. 6, the lubricating oil 46 is arranged between a bottom portion of the shaft 41 and the thrust cap 44. The bottom portion of the shaft 41 is supported stably by the thrust cap 44 when gravity acting on the motor 11 and the impeller 12 is greater than a lifting force acting thereon, or when the motor 11 is rotated at a low speed.

Figure 11:
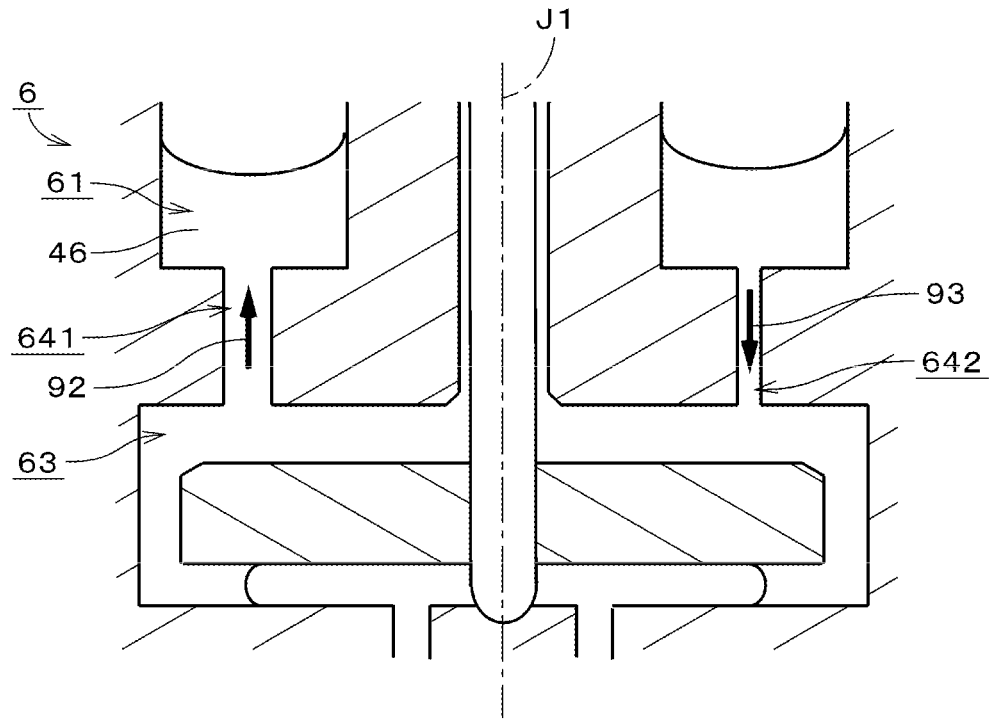
FIG. 11 is a schematic diagram of a circulation channel according to the first preferred embodiment.

FIG. 11 is a schematic diagram illustrating a circulation channel 6 of the lubricating oil 46. On a left-hand side of FIG. 11, the first seal gap 61 and the thrust gap 63 are shown to be in communication with each other through one of the first side communicating channels 641. On a right-hand side of FIG. 11, the first seal gap 61 and the thrust gap 63 are shown to be in communication with each other through one of the second side communicating channels 642.

A central line of the first side communicating channel 641 is farther away from the central axis J1 than is a central line of the second side communicating channel 642. Therefore, during the drive of the motor 11, due to an effect of a centrifugal force acting on the lubricating oil 46, the lubricating oil 46 is caused to flow upward in the first side communicating channel 641 as indicated by an arrow 92 in FIG. 11, while the lubricating oil 46 is caused to flow downward in the second side communicating channel 642 as indicated by an arrow 93. In the motor 11, the first side communicating channels 641 and the second side communicating channels 642, which have mutually different radial widths, are provided, and the lubricating oil 46 is accordingly caused to circulate between the thrust gap 63 and the first seal gap 61. Therefore, even if an air bubble is generated in the thrust gap 63, the air bubble is discharged out of the bearing mechanism 4 through the first seal gap 61. Moreover, deterioration of the lubricating oil 46 due to an increase in temperature of the lubricating oil 46 is avoided, and the bearing mechanism 4 achieves a longer life.

The fan 1 according to the first preferred embodiment has been described above. Regarding the second seal gap 67, the side minute gap 65 is arranged radially outward of the first seal gap 61, and the lower minute gap 66 is arranged to extend radially inward from a bottom portion of the side minute gap 65. This makes it possible to arrange the position of the second seal portion 67a (the position of the surface of the lubricating oil 46 therein) to coincide in the radial direction with the position of each side communicating channel 64, i.e., the position of a bottom of the first seal portion 61a during the drive of the motor 11. The motor 11 is arranged to enable the surface of the lubricating oil 46 in each of the first and second seal gaps 61 and 67 to be positioned stably at a desired position as compared to the case where the two seal portions are displaced from each other in the radial direction. This contributes to easily preventing a leakage of the lubricating oil 46. Moreover, as compared to the case where the second seal portion is defined in the gap radially outside the thrust plate, the position of each side communicating channel 64 and the position of the surface of the lubricating oil 46 in the second seal portion 67a can be arranged to coincide with each other in the radial direction more precisely, free from an effect of an error or the like in processing those members which together define the gap. The same holds true for other preferred embodiments of the present invention described below.

Here, an explanation will now be provided of the position of the surface of the lubricating oil 46 in the second seal portion 67a in the case where a difference in pressure between the first and second seal portions 61a and 67a has occurred. Suppose, for example, that, in a situation in which there is no difference in pressure between the first and second seal portions 61a and 67a, a difference in pressure between the first seal portion 61a and the surface of the lubricating oil 46 in the second seal portion 67a illustrated in FIG. 6 is 0 Pa, and a difference in pressure between the first seal portion 61a and the side minute gap 65 is 2000 Pa. Then, a difference in pressure between the first seal portion 61a and a middle position between a lower end of the side minute gap 65 and the surface of the lubricating oil 46 in the lower minute gap 66 is about 1000 Pa. If the pressure in the second seal portion 67a becomes 1000 Pa higher than the pressure in the first seal portion 61a, the surface of the lubricating oil 46 in the second seal portion 67a will be defined at the aforementioned middle position. As described above, even if a difference in pressure occurs between the first and second seal portions 61a and 67a, significant fluctuation of the position of the surface of the lubricating oil 46 in the second seal portion 67a is prevented because the side minute gap 65 is arranged radially outward of each of the first and second seal portions 61a and 67a.

In the motor 11, an angle defined between the line 91 which bisects an angle defined between surfaces radially inside the surfaces which together define the lower minute gap 66 and the line J2 which passes through the end opening of the lower minute gap 66 and which extends in parallel with the central axis J1 is preferably arranged to be in the range of about 45 degrees to about 135 degrees. The same holds true for each of FIGS. 18, 19, 20, 21, 22, 23, 24, 25, 26, 27, and 28, which will be described below. The surface of the lubricating oil 46 defined in the lower minute gap 66 is thereby arranged to face substantially radially inward. As a result, a leakage of the lubricating oil 46 can be prevented even if a shock or the like causes an axial acceleration of the motor 11. Moreover, even if an acceleration of the motor 11 occurs in a direction perpendicular to the central axis J1, a leakage of the lubricating oil 46 can be prevented because a centrifugal force acts on the second seal portion 67a. Furthermore, control of the positions of the surfaces of the lubricating oil 46 is made easier. This enables the lower minute gap 66 to have a relatively great axial width so that a relatively large amount of the lubricating oil 46 can be held therein. Furthermore, because no dynamic pressure generation portion is defined in the side minute gap 65, design of those components which together define the side minute gap 65 can be simple.

Because the first seal gap 61 is defined between the sleeve 43 and the bearing housing 311, it is possible to ensure a sufficient axial dimension and a sufficient circumferential dimension of the first seal gap 61. It is therefore possible to ensure a sufficient capacity of the first seal gap 61 so that a sufficient amount of the lubricating oil 46 can be held inside the bearing mechanism 4.

Furthermore, because the first seal gap 61 is defined between the sleeve 43 and the bearing housing 311, it is possible to make the axial distance between the first and second seal portions 61a and 67a relatively short. This makes it possible to reduce fluctuation of the surface of the lubricating oil 46 in each of the first and second seal portions 61a and 67a due to an effect of gravity. Furthermore, because the first seal portion 61a is defined at a deep position in the first seal gap 61, a shock applied to the motor 11 will not cause the lubricating oil 46 in the first seal gap 61 to be scattered out of the bearing mechanism 4. Because the first seal gap 61 is arranged radially outside the sleeve 43, it is possible to ensure a sufficient axial dimension of the sleeve 43.

Referring to FIG. 6, the cap projecting portion 441 is defined in the thrust cap 44. As a result, a shoulder 441b is defined between the lower minute gap 66 and the through hole 442, which is arranged radially inward of the lower minute gap 66. As a result, even if a portion of the lubricating oil 46 travels radially inward out of the lower minute gap 66, surface tension will cause the portion of the lubricating oil 46 to stop on the shoulder 441b, thereby preventing a leakage of the lubricating oil 46 through the through hole 442. Furthermore, because the oil-repellent film 443 is arranged in the through hole 442 of the thrust cap 44, it is possible to more securely prevent a leakage of the lubricating oil 46 through the through hole 442.

Because the thrust plate 42 is made of high-strength brass, it is possible to improve wear resistance of the thrust plate 42, and also to reduce a production cost of the motor 11. Because the sleeve 43 is defined by a metallic sintered body, it is possible to further reduce the production cost of the motor 11. Because the sleeve 43 is impregnated with the lubricating oil 46, it is possible to constantly supply the lubricating oil 46 to each of the radial gap 62 and the thrust gap 63, thereby securely preventing the sleeve 43 from coming into contact with the shaft 41 or the thrust plate 42. This makes it possible to prevent seizing between the sleeve 43 and each of the shaft 41 and the thrust plate 42, and also to prevent wear of each of the sleeve 43, the shaft 41, and the thrust plate 42, thereby increasing the life of the bearing mechanism 4. Moreover, the motor 11 is enabled to rotate at a higher speed, to increase the air volume of the fan 1.

Note that, in the bearing mechanism 4, a radial dynamic pressure groove array may be defined in one of the outer circumferential surface 411 of the shaft 41 and the inner circumferential surface 432 of the sleeve 43 so that a radial dynamic pressure bearing portion will be defined in the radial gap 62 to produce a radial fluid dynamic pressure acting on the lubricating oil 46. In this case, the motor 11 is enabled to rotate at a higher speed, and a self-excited vibration, such as an oil whirl or an oil whip, is made less likely to occur. In addition, a reduction in wear of each of the shaft 41 and the sleeve 43 is achieved.

Note that, regarding the thrust gap 63, a thrust dynamic pressure groove array may be defined in the lower surface 434 of the sleeve 43. The same holds true for the other preferred embodiments of the present invention described below, except for a preferred embodiment of the present invention illustrated in FIG. 14.

Second Preferred Embodiment

Figure 12:
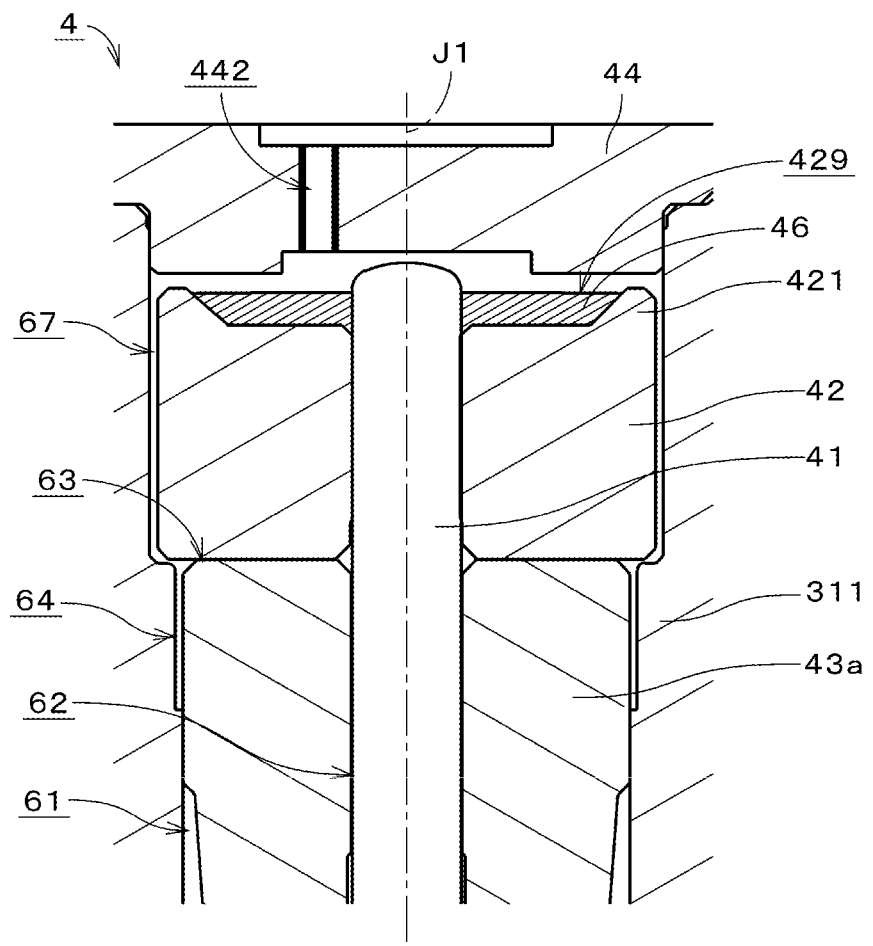
FIG. 12 is a vertical cross-sectional view of a bearing mechanism according to a second preferred embodiment of the present invention.

FIG. 12 is a diagram illustrating a lower portion of a bearing mechanism 4 of a motor 11 according to a second preferred embodiment of the present invention. In FIG. 12, the bearing mechanism 4 is turned upside down. The bearing mechanism 4 includes a sleeve 43a made of a metal. The sleeve 43a is not impregnated with a lubricating oil 46. The motor 11 according to the second preferred embodiment is otherwise similar in structure to the motor 11 according to the first preferred embodiment. Accordingly, like members or portions are designated by like reference numerals, and redundant description is omitted.

A bottom portion of a thrust plate 42, i.e., a portion of the thrust plate 42 shown on an upper side in FIG. 12, includes an annular recessed portion 429 defined radially inward of a plate projecting portion 421 thereof and recessed downward in FIG. 12, i.e., recessed in a direction of a top portion of the thrust plate 42. The recessed portion 429 is arranged axially opposite a through hole 442 of a thrust cap 44. The through hole 442 is arranged radially inward of a side communicating channel 64.

When the bearing mechanism 4 is manufactured, components of the bearing mechanism 4 are first assembled together, and thereafter, the bearing mechanism 4 is placed such that the thrust cap 44 faces upward. Next, the lubricating oil 46 is injected into the recessed portion 429 through the through hole 442. Once the lubricating oil 46 injected is sufficiently held inside the recessed portion 429, a shaft 41 and the thrust plate 42 are rotated about a central axis J1. At this time, a centrifugal force causes the lubricating oil 46 to flow into a second seal gap 67 and a first seal gap 61.

After a predetermined period of time, rotation of the shaft 41 and the thrust plate 42 is stopped. The lubricating oil 46 in the first and second seal gaps 61 and 67 is spread through an entire thrust gap 63 and an entire radial gap 62. Note that the lubricating oil 46 is separately injected into a gap defined between the thrust cap 44 and a bottom portion of the shaft 41, i.e., a portion of the shaft 41 shown on the upper side in FIG. 12.

In the case where the lubricating oil is injected directly into the first and second seal gaps, a difference between a surface tension of a portion of the lubricating oil which is in the seal gaps and a surface tension of a portion of the lubricating oil which has flowed into another gap, such as the thrust gap, is only about 100 Pa during a process of injecting the lubricating oil. Therefore, it takes a long time for the lubricating oil 46 to spread through the entire gaps. It may even happen that the lubricating oil 46 fails to spread sufficiently through the bearing mechanism. In contrast, in the case of the bearing mechanism 4 according to the present preferred embodiment, a pressure of about thousands of pascals (Pa) acts on the lubricating oil 46 because of the centrifugal force. This enables filling of the lubricating oil 46 into the bearing mechanism 4 to be accomplished easily and in a short time. This leads to a reduction in a production cost of the bearing mechanism 4. Because the through hole 442 is arranged radially inward of the side communicating channel 64, a leakage of the lubricating oil 46 through the through hole 442 is prevented.

In the bearing mechanism 4, surfaces of the lubricating oil 46 are defined at a plurality of locations, and therefore, the filling of the lubricating oil 46 can be accomplished more easily than in the case where a surface of the lubricating oil 46 is defined at only one location. Moreover, a reduction in the likelihood that an air bubble will stay inside the bearing mechanism 4 is achieved. Manufacture of the bearing mechanism 4 can be accomplished more easily and at a lower cost than in the case where a method of injecting the lubricating oil into a seal gap under vacuum is employed. During the manufacture of the bearing mechanism 4, running-in, or so-called aging, of the bearing mechanism 4 may be carried out after the filling of the lubricating oil 46 is completed. Any air bubble inside the bearing mechanism 4 is thereby discharged more securely.

Note that, in the manufacture of the bearing mechanism 4, the filling of the lubricating oil 46 into the gaps in the bearing mechanism 4 may be accomplished through rotation of the sleeve 43a, a bearing housing 311, and the thrust cap 44. In this case, the through hole 442 is arranged radially inward of each of the side communicating channel 64 and the first seal gap 61. This contributes to preventing a leakage of the lubricating oil 46 through the through hole 442. Also note that the filling of the lubricating oil 46 may be accomplished through rotation of the entire bearing mechanism 4.

Figure 13:
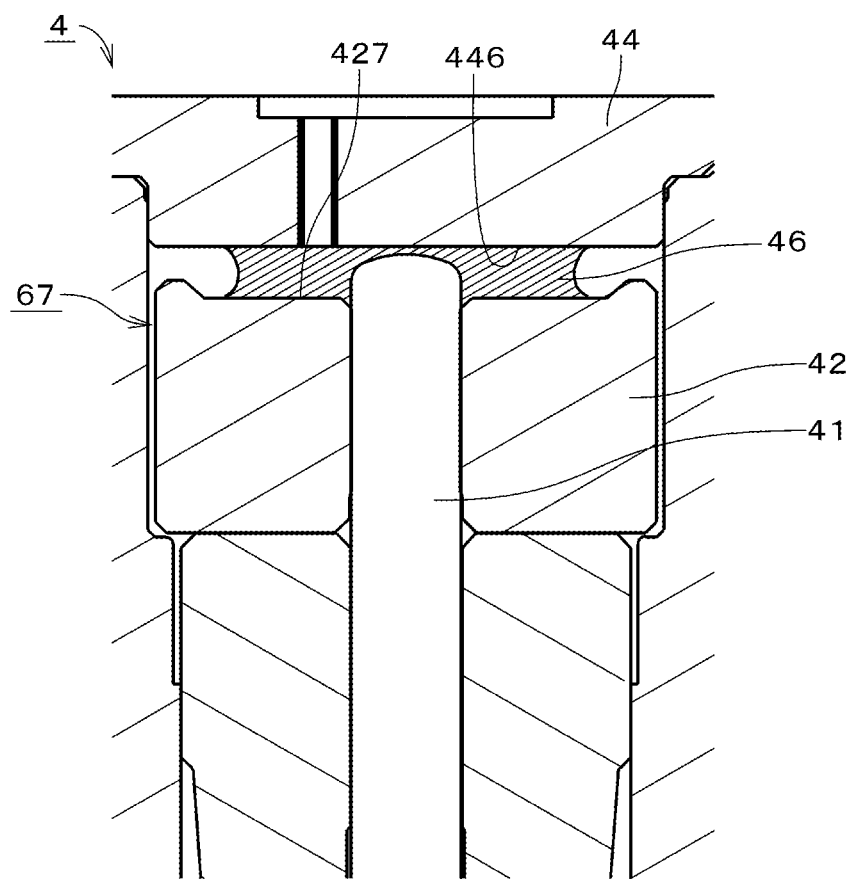
FIG. 13 is a vertical cross-sectional view illustrating a process of manufacturing a bearing mechanism according to a preferred embodiment of the present invention.

Referring to FIG. 13, in the second preferred embodiment, when the lubricating oil 46 is injected into the bearing mechanism 4, the lubricating oil 46 may be held between an upper surface 446 of the thrust cap 44 and each of an end surface of the shaft 41 and a lower surface 427 of the thrust plate 42, and the lubricating oil 46 may be caused to flow into the second seal gap 67 using the centrifugal force. In this case, the filling of the lubricating oil 46 into the gaps in the bearing mechanism 4 and the gap between the shaft 41 and the thrust cap 44 is accomplished by only one instance of oil injection. Note that, in the second preferred embodiment, the lubricating oil 46 may also be injected into a top portion of the radial gap 62 simultaneously with the injection of the lubricating oil 46 into the second seal gap 67.

Other Preferred Embodiments

Figure 14:
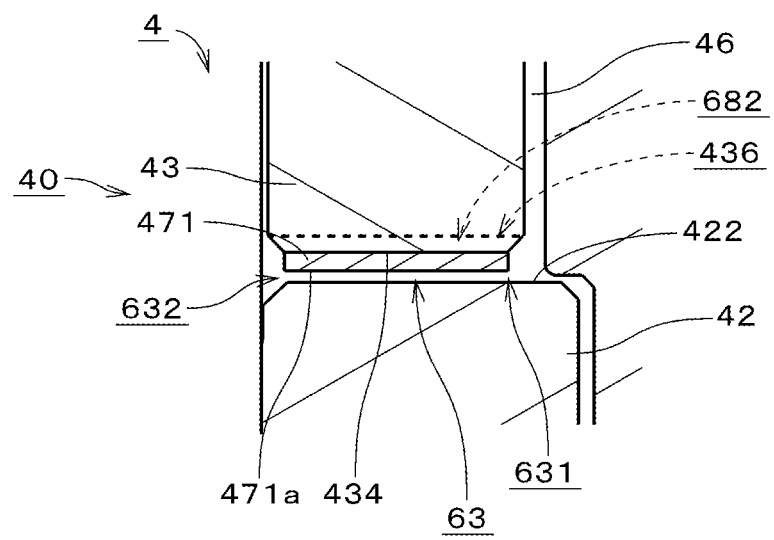
FIG. 14 is a vertical cross-sectional view of a bearing mechanism according to another preferred embodiment of the present invention.

FIG. 14 is a diagram illustrating a bearing mechanism 4 according to another preferred embodiment of the present invention. The sleeve portion 40 further includes an annular lower plate 471 arranged on the lower surface 434 of the sleeve 43. The bottom portion of the sleeve 43 includes a lower-side groove portion 436 arranged to extend in the radial direction. The bearing mechanism 4 according to the present preferred embodiment is otherwise similar in structure to the bearing mechanism 4 according to the first preferred embodiment. A communicating channel 682 extending in the radial direction is defined between the lower-side groove portion 436 and the lower plate 471. Hereinafter, the communicating channel 682 will be referred to as a "lower communicating channel 682". The thrust gap 63 is defined between a lower surface 471a of the lower plate 471 and the upper surface 422 of the thrust plate 42. A thrust dynamic pressure groove array is defined in one of the lower surface 471a of the lower plate 471 and the upper surface 422 of the thrust plate 42.

The lower communicating channel 682 is arranged to bring the outer edge portion 631 and the inner edge portion 632 of the thrust gap 63 into communication with each other. During the drive of the motor 11, the lubricating oil 46 flows from the inner edge portion 632 toward the outer edge portion 631 of the thrust gap 63. The lubricating oil 46 further flows from an outer edge portion toward an inner edge portion of the lower communicating channel 682, and returns to the inner edge portion 632 of the thrust gap 63. The lubricating oil 46 thus circulates through the thrust gap 63 and the lower communicating channel 682, and any air bubble in the thrust gap 63 can be easily discharged out of the bearing mechanism 4 through the first seal gap 61 illustrated in FIG. 2. Note that the direction of circulation of the lubricating oil 46 may be reversed. In this case, however, the thrust dynamic pressure groove array is arranged to have a pump-in configuration so that a radially inward dynamic pressure will be generated in the thrust gap 63. The same holds true for preferred embodiments of the present invention illustrated in FIGS. 15, 16, and 17.

Figure 15:
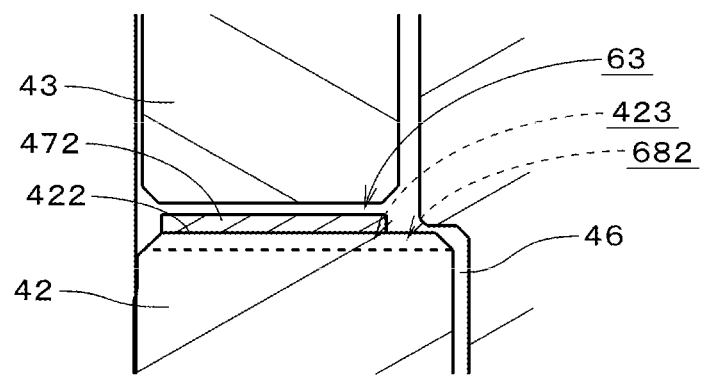
FIG. 15 is a vertical cross-sectional view of a bearing mechanism according to yet another preferred embodiment of the present invention.

FIG. 15 is a diagram illustrating a lower communicating channel 682 according to another preferred embodiment of the present invention. The top portion of the thrust plate 42 includes a groove portion 423 arranged to extend in the radial direction. An annular plate member 472 is arranged on the upper surface 422 of the thrust plate 42, and a lower communicating channel 682 extending in the radial direction is defined between the groove portion 423 and the plate member 472. The thrust gap 63 is defined between the plate member 472 and the sleeve 43. During the drive of the motor 11, the lubricating oil 46 circulates through the thrust gap 63 and the lower communicating channel 682, whereby any air bubble generated in the thrust gap 63 is efficiently discharged.

Figure 16:
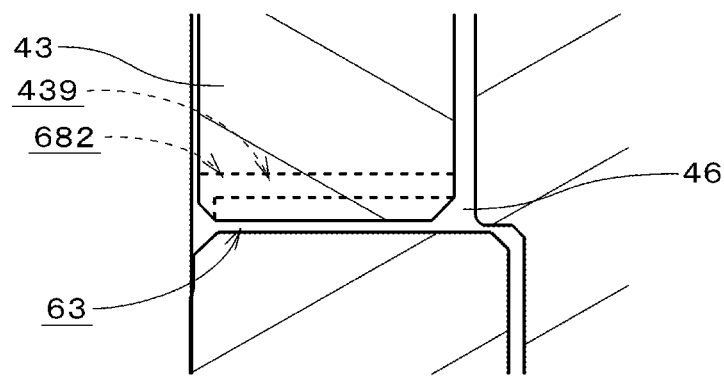
FIG. 16 is a vertical cross-sectional view of a bearing mechanism according to yet another preferred embodiment of the present invention.
Figure 17:
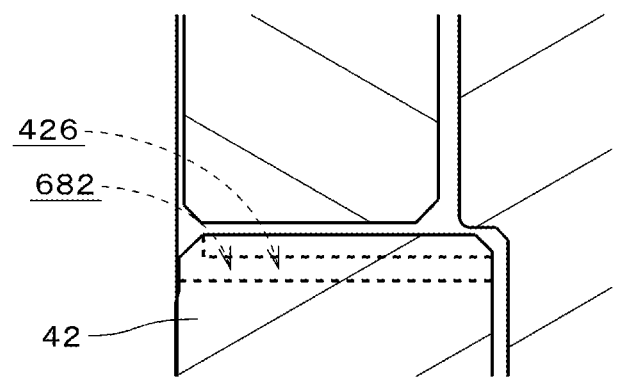
FIG. 17 is a vertical cross-sectional view of a bearing mechanism according to yet another preferred embodiment of the present invention.

FIG. 16 is a diagram illustrating a lower communicating channel 682 according to yet another preferred embodiment of the present invention. The bottom portion of the sleeve 43 includes a through hole 439 arranged to extend in the radial direction. In FIG. 16, the through hole 439 functions as the lower communicating channel 682, and during the drive of the motor 11, the lubricating oil 46 circulates through the through hole 439 and the thrust gap 63. FIG. 17 is a diagram illustrating a lower communicating channel 682 according to yet another preferred embodiment of the present invention. The top portion of the thrust plate 42 includes a through hole 426 arranged to extend in the radial direction. The through hole 426 functions as the lower communicating channel 682.

Figure 18:
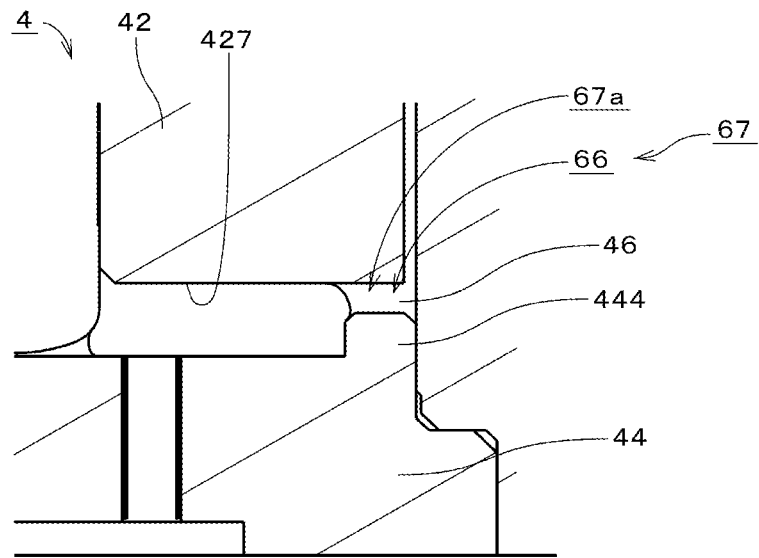
FIG. 18 is a vertical cross-sectional view illustrating a lower minute gap according to another preferred embodiment of the present invention.

FIG. 18 is a diagram illustrating a bearing mechanism 4 according to yet another preferred embodiment of the present invention. The thrust cap 44 includes a cap projecting portion 444 arranged to project toward the thrust plate 42. The plate projecting portion 421 of the thrust plate 42 is eliminated. In the second seal gap 67, the lower minute gap 66 is defined between the cap projecting portion 444 and the lower surface 427 of the thrust plate 42. The second seal portion 67a is defined in the lower minute gap 66 to retain the lubricating oil 46 therein, and a surface of the lubricating oil 46 is defined in the lower minute gap 66. Also in the present preferred embodiment illustrated in FIG. 18, since the surface of the lubricating oil 46 is arranged to face radially inward, the likelihood that a shock or the like applied to the motor 11 will cause a leakage of the lubricating oil 46 is reduced.

Figure 19:
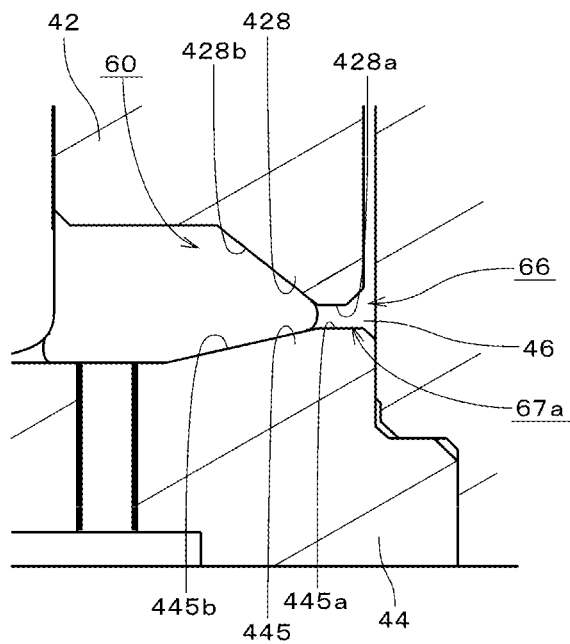
FIG. 19 is a vertical cross-sectional view illustrating a lower minute gap according to yet another preferred embodiment of the present invention.

FIG. 19 is a diagram illustrating a lower minute gap 66 according to another preferred embodiment of the present invention. The thrust plate 42 includes a plate projecting portion 428 arranged to project toward the thrust cap 44. The plate projecting portion 428 includes a lower surface 428a and an inclined surface 428b arranged to extend radially inward and obliquely upward from the lower surface 428a. The thrust cap 44 includes a cap projecting portion 445 arranged to project toward the thrust plate 42. The cap projecting portion 445 includes an upper surface 445a and an inclined surface 445b arranged to extend radially inward and obliquely downward from the upper surface 445a.

The lower minute gap 66 is defined between the lower surface 428a of the plate projecting portion 428 and the upper surface 445a of the cap projecting portion 445. The second seal portion 67a is defined in the lower minute gap 66. A gap 60 is defined between the inclined surfaces 428b and 445b, and the axial width of the gap 60 is arranged to gradually increase radially inward from the lower minute gap 66. Because of provision of the gap 60, a portion of the lubricating oil 46 which has traveled radially inward out of the lower minute gap 66 is retained in the gap 60 through capillary action. This contributes to more securely preventing a leakage of the lubricating oil 46.

Figure 20:
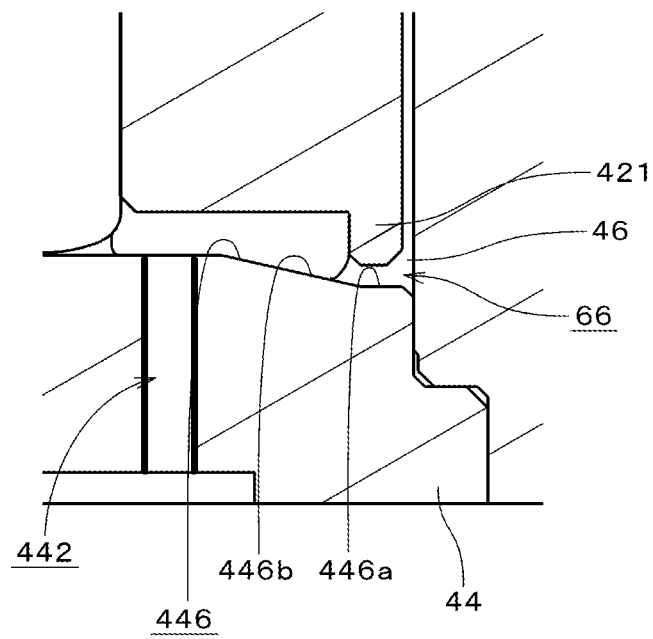
FIG. 20 is a vertical cross-sectional view illustrating a lower minute gap according to yet another preferred embodiment of the present invention.

FIG. 20 is a diagram illustrating a lower minute gap 66 according to yet another preferred embodiment of the present invention. The upper surface 446 of the thrust cap 44 includes an outer edge portion 446a and an inclined surface 446b arranged to extend radially inward and obliquely upward from the outer edge portion 446a. The lower minute gap 66 is defined between the plate projecting portion 421 and a combination of the outer edge portion 446a and a portion of the inclined surface 446b. An upper end opening of the through hole 442 of the thrust cap 44 is arranged at a level higher than that of the lower minute gap 66 because of provision of the inclined surface 446b, whereby a leakage of the lubricating oil 46 through the through hole 442 can be prevented.

Figure 21:
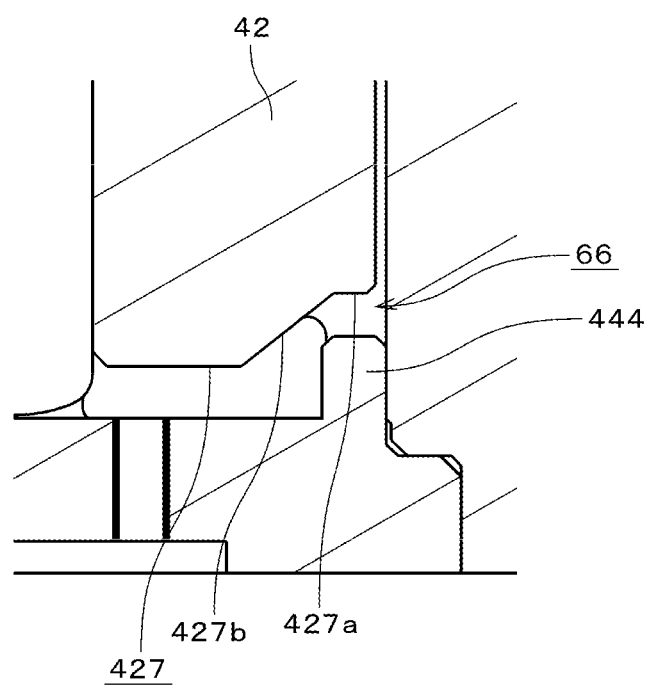
FIG. 21 is a vertical cross-sectional view illustrating a lower minute gap according to yet another preferred embodiment of the present invention.

FIG. 21 is a diagram illustrating a lower minute gap 66 according to yet another preferred embodiment of the present invention. The lower surface 427 of the thrust plate 42 includes an outer edge portion 427a and an inclined surface 427b arranged to extend radially inward and obliquely downward from the outer edge portion 427a. The lower minute gap 66 is defined between the cap projecting portion 444 and a combination of the outer edge portion 427a and a portion of the inclined surface 427b.

Figure 22:
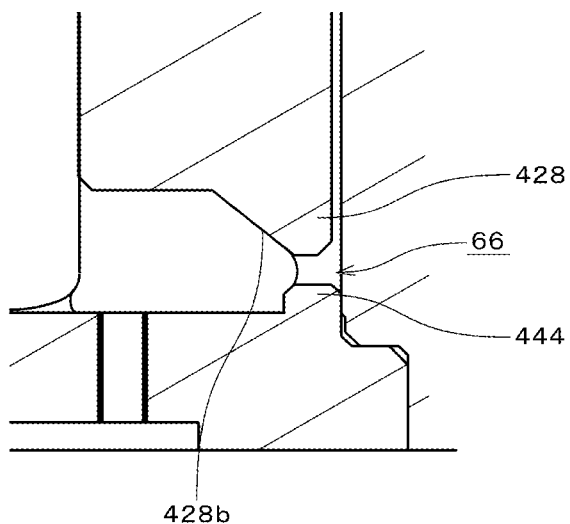
FIG. 22 is a vertical cross-sectional view illustrating a lower minute gap according to yet another preferred embodiment of the present invention.

Referring to FIG. 22, in a bearing mechanism 4 according to yet another preferred embodiment of the present invention, the lower minute gap 66 may be defined between the plate projecting portion 428 which includes the inclined surface 428b and the cap projecting portion 444 which does not include the inclined surface. As described above, in bearing mechanisms 4 according to preferred embodiments of the present invention, the plate projecting portion and the cap projecting portion between which the lower minute gap 66 is defined may have a variety of shapes. Also note that the lower minute gap 66 may be defined between the cap projecting portion and the lower surface 427 of the thrust plate 42 which does not include the plate projecting portion. Also note that the lower minute gap 66 may be defined between the plate projecting portion and the upper surface 446 of the thrust cap 44 which does not include the cap projecting portion. In short, the outer circumferential portion of each of at least one of the thrust plate 42 and the thrust cap 44 includes an annular projecting portion arranged to project toward the other one of the thrust plate 42 and the thrust cap 44, and the lower minute gap 66 is defined between this projecting portion and the other one of the thrust plate 42 and the thrust cap 44.

Figure 23:
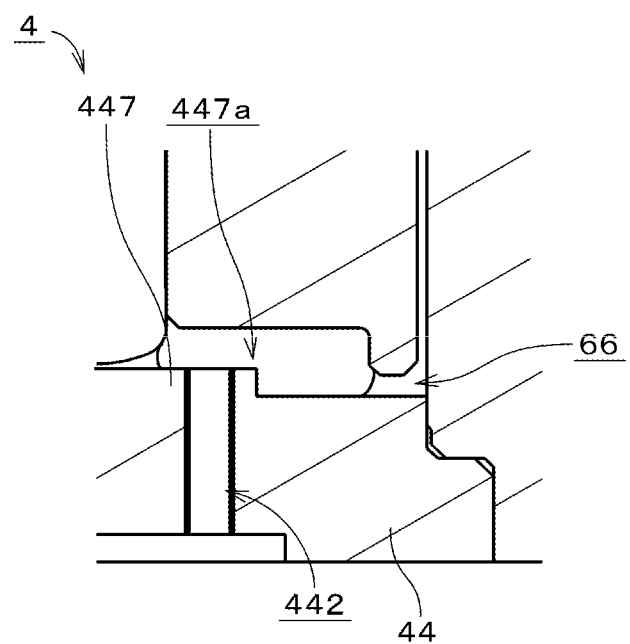
FIG. 23 is a vertical cross-sectional view illustrating a thrust cap according to another preferred embodiment of the present invention.
Figure 24:
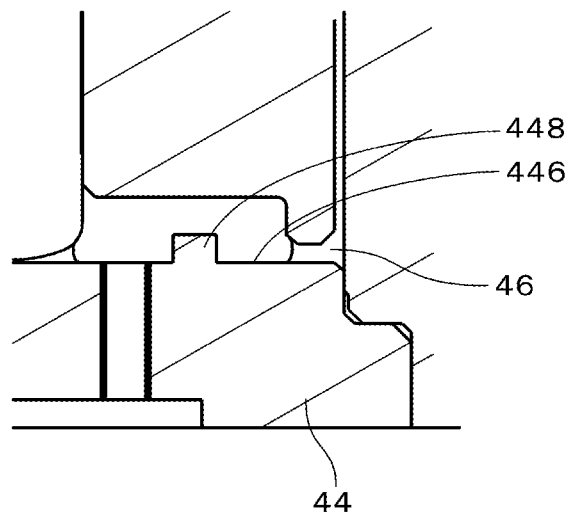
FIG. 24 is a vertical cross-sectional view illustrating a thrust cap according to yet another preferred embodiment of the present invention.
Figure 25:
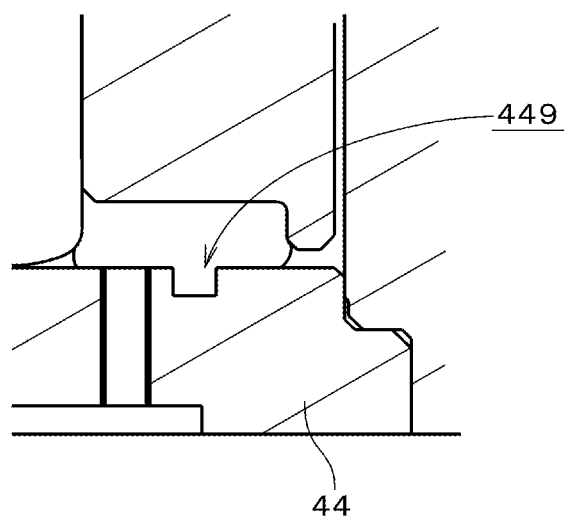
FIG. 25 is a vertical cross-sectional view illustrating a thrust cap according to yet another preferred embodiment of the present invention.

FIG. 23 is a diagram illustrating a bearing mechanism 4 according to another preferred embodiment of the present invention. A central portion of the thrust cap 44 which includes the through hole 442 includes a cap projecting portion 447 arranged to project upward. As a result of provision of the cap projecting portion 447, a shoulder 447a is defined between the through hole 442 and the lower minute gap 66, and this contributes to preventing a leakage of the lubricating oil 46 through the through hole 442. Also, referring to FIG. 24, in a bearing mechanism 4 according to yet another preferred embodiment of the present invention, the upper surface 446 of the thrust cap 44 may include an annular projecting portion 448 arranged to prevent a leakage of the lubricating oil 46. Also, referring to FIG. 25, in a bearing mechanism 4 according to yet another preferred embodiment of the present invention, the upper surface 446 of the thrust cap 44 may include an annular groove portion 449 arranged to prevent a leakage of the lubricating oil 46.

Figure 26:
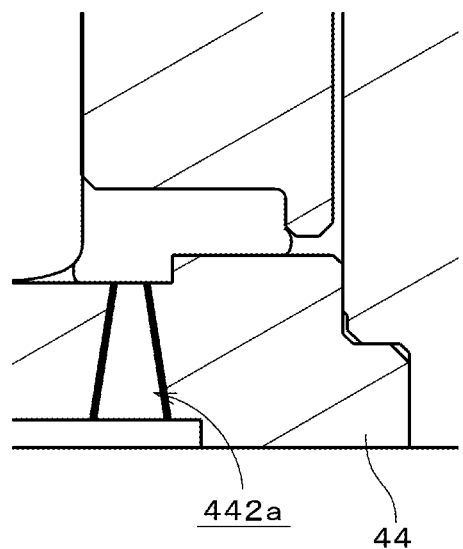
FIG. 26 is a vertical cross-sectional view illustrating a thrust cap according to yet another preferred embodiment of the present invention.

FIG. 26 is a diagram illustrating a through hole defined in the thrust cap 44 according to another preferred embodiment of the present invention. The thrust cap 44 includes a through hole 442a defined therein. The diameter of an inner circumferential surface of the through hole 442a is arranged to gradually decrease with increasing height. A leakage of the lubricating oil 46 through the through hole 442a is prevented more securely through capillary action. Moreover, when an oil-repellent agent is applied to the inner circumferential surface of the through hole 442a, the oil-repellent agent is able to easily spread throughout the inner circumferential surface.

Figure 27:
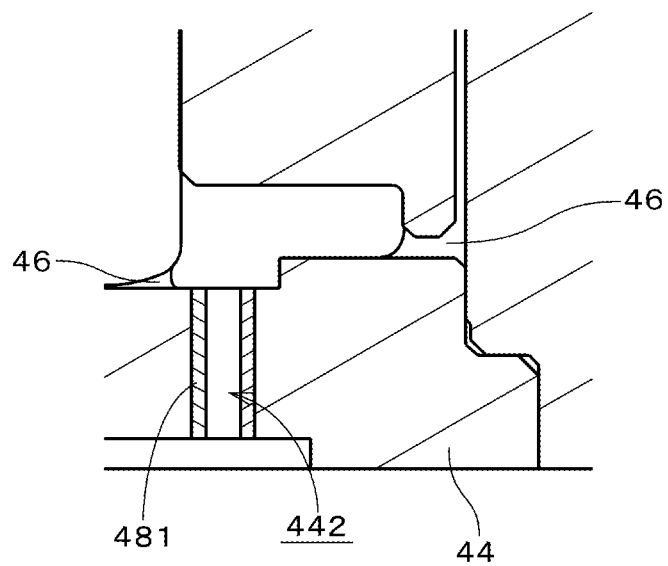
FIG. 27 is a vertical cross-sectional view illustrating a thrust cap according to yet another preferred embodiment of the present invention.
Figure 28:
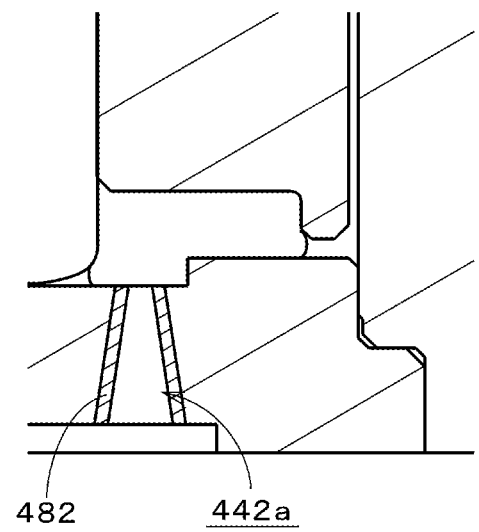
FIG. 28 is a vertical cross-sectional view illustrating a thrust cap according to yet another preferred embodiment of the present invention.

Referring to FIG. 27, in a bearing mechanism 4 according to yet another preferred embodiment of the present invention, a tubular member 481 having an oil-repellent property may be fitted in the through hole 442 of the thrust cap 44. This contributes to preventing a leakage of the lubricating oil 46 through the through hole 442. Also, referring to FIG. 28, a tubular member 482 having the oil-repellent property and the width of which is arranged to gradually decrease with increasing height may be fitted in the through hole 442a illustrated in FIG. 26. When the tubular member 482 is fitted in the through hole 442a, axial positioning of the tubular member 482 is not required because the diameter of the inner circumferential surface of the through hole 442a is arranged to gradually decrease with increasing height.

Figure 29:
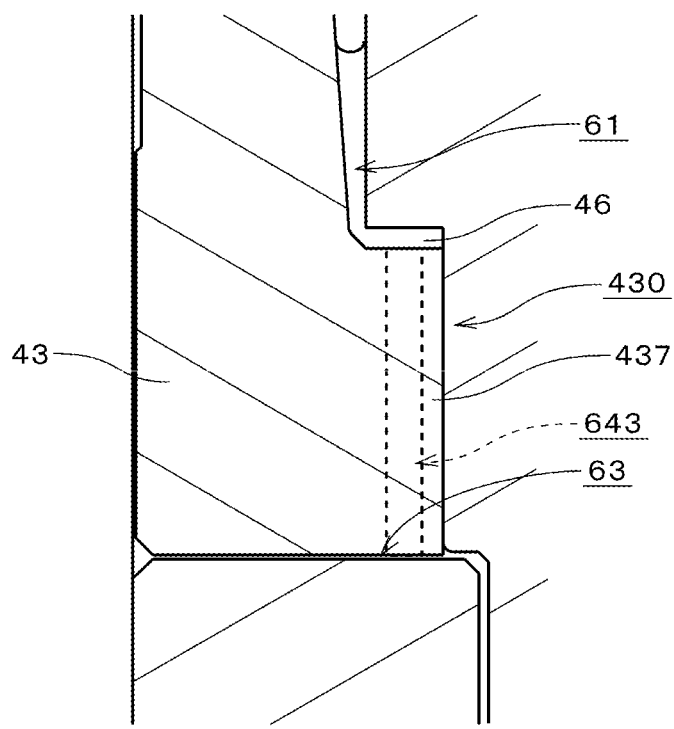
FIG. 29 is a vertical cross-sectional view illustrating a sleeve portion according to another preferred embodiment of the present invention.

FIG. 29 is a diagram illustrating a bearing mechanism 4 according to yet another preferred embodiment of the present invention. The bottom portion of the outer circumferential portion 430 of the sleeve 43 includes a projecting portion 437 arranged to project radially outward. The projecting portion 437 includes a plurality of side communicating channels 643 each of which is arranged to extend in the axial direction through the projecting portion 437. The first seal gap 61 and the thrust gap 63 are brought into communication with each other through the side communicating channels 643. In FIG. 29, the side communicating channels 643 may include a plurality of types of side communicating channels having different radial widths, as with the side communicating channels 64 illustrated in FIGS. 3 and 4. This enables the lubricating oil 46 to circulate between the first seal gap 61 and the thrust gap 63.

Figure 30:
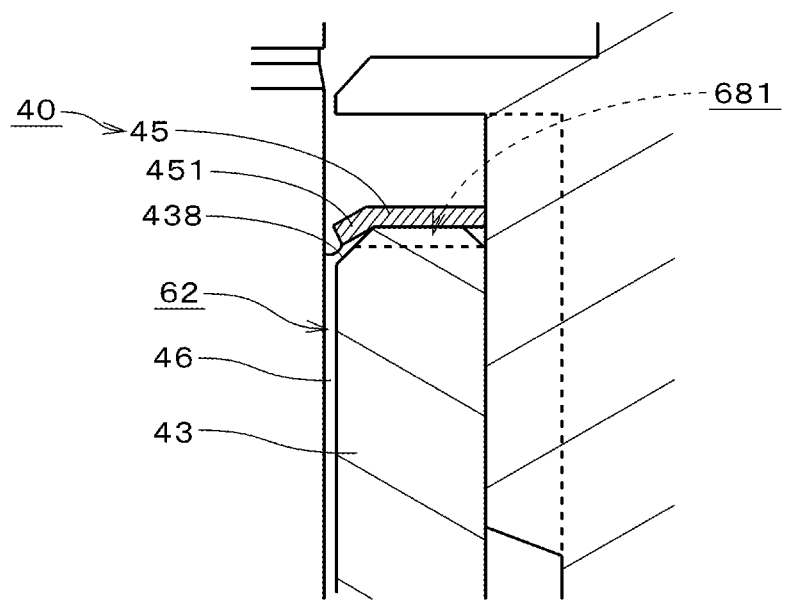
FIG. 30 is a vertical cross-sectional view illustrating a sleeve portion according to yet another preferred embodiment of the present invention.
Figure 31:
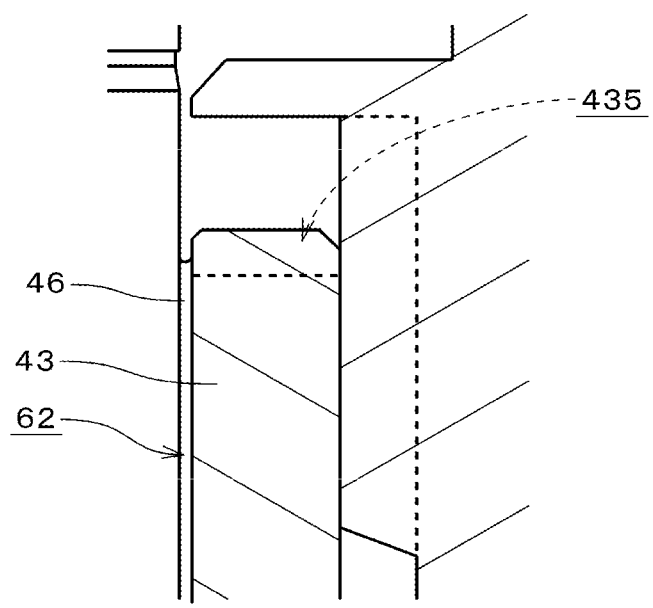
FIG. 31 is a vertical cross-sectional view illustrating a sleeve portion according to yet another preferred embodiment of the present invention.

FIG. 30 is a diagram illustrating a sleeve portion 40 according to another preferred embodiment of the present invention. A radially inner end portion 451 of the upper plate 45 of the sleeve portion 40 is bent downward. This makes it easier for the lubricating oil 46 to be guided from the upper communicating channel 681 into the radial gap 62. Note that the inner end portion 451 is preferably arranged to have a slope smaller than that of a chamfer 438 defined in a radially inner edge of the top portion of the sleeve 43. Also note that the sleeve portion 40 of the bearing mechanism 4 may be defined by a single metallic sintered body impregnated with the lubricating oil. In this case, referring to FIG. 31, the upper-side groove portion 435 defined in the top portion of the sleeve 43 may be arranged to have a sufficient depth to guide a portion of the lubricating oil 46 which soaks out of the top portion of the sleeve 43 into the radial gap 62. In FIG. 31, the upper-side groove portion 435 thus functions as the upper communicating channel, whereby a leakage of the lubricating oil 46 through the top portion of the sleeve 43 can be prevented.

Figure 32:
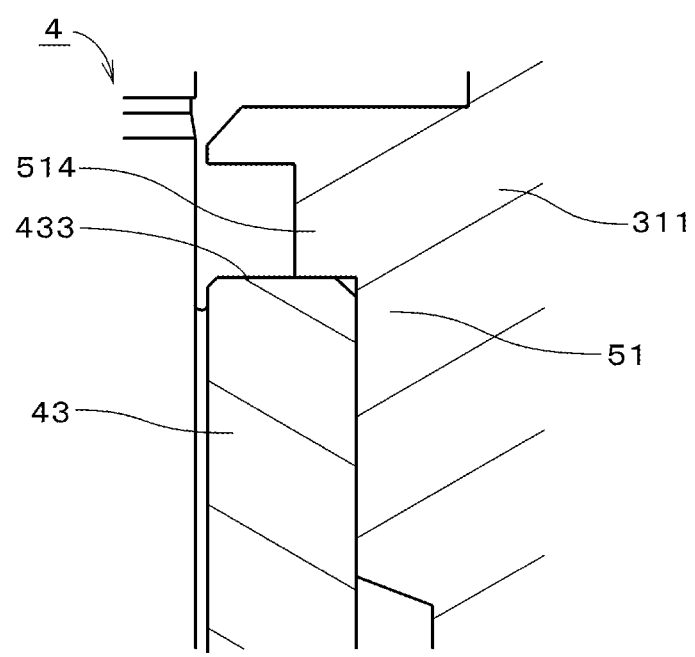
FIG. 32 is a vertical cross-sectional view illustrating a sleeve portion according to yet another preferred embodiment of the present invention.

FIG. 32 is a diagram illustrating a bearing mechanism 4 according to yet another preferred embodiment of the present invention. The first contact portion 51 of the bearing housing 311 further includes an axial contact portion 514 arranged to be in axial contact with the upper surface 433 of the sleeve 43. Provision of the axial contact portion 514 facilitates axial positioning of the sleeve 43 with respect to the bearing housing 311.

Figure 33:
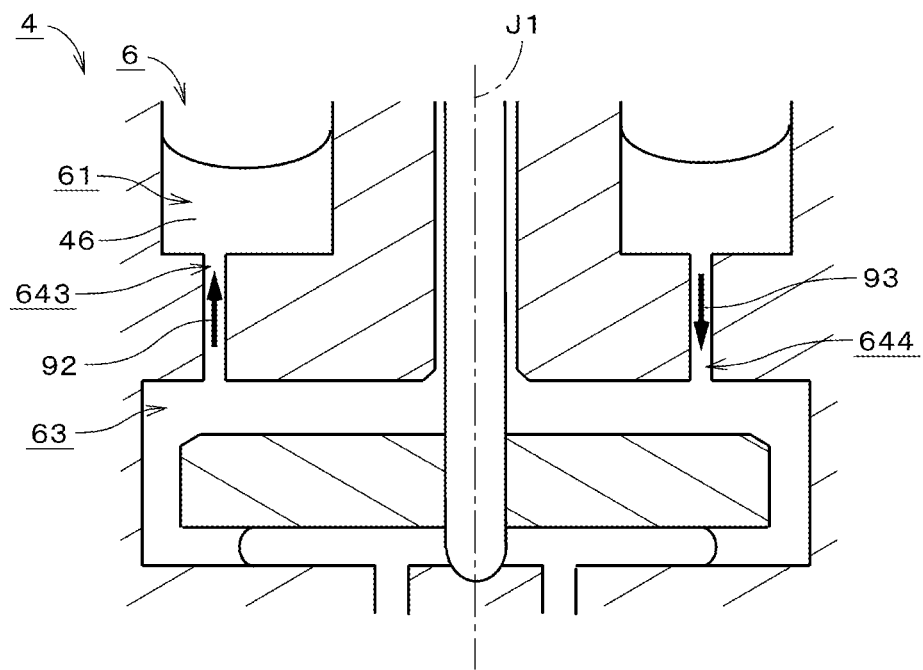
FIG. 33 is a schematic diagram illustrating a circulation channel according to another preferred embodiment of the present invention.

FIG. 33 is a schematic diagram of a circulation channel 6, illustrating side communicating channels, according to another preferred embodiment of the present invention. FIG. 33 is comparable with FIG. 11. A plurality of side communicating channels 643 and 644 having different radial distances from the central axis J1 may be provided in the bearing mechanism 4. During the drive of the motor 11, due to an effect of a centrifugal force, the lubricating oil 46 is caused to flow upward in the side communicating channel 643, a central line of which is farther away from the central axis J1 than is a central line of the side communicating channel 644, as indicated by an arrow 92 in FIG. 33, while the lubricating oil 46 is caused to flow downward in the side communicating channel 644, the central line of which is closer to the central axis J1 than is the central line of the side communicating channel 643, as indicated by an arrow 93. Provision of the side communicating channels 643 and 644 enables the lubricating oil 46 to circulate between the first seal gap 61 and the thrust gap 63.

Figure 34:
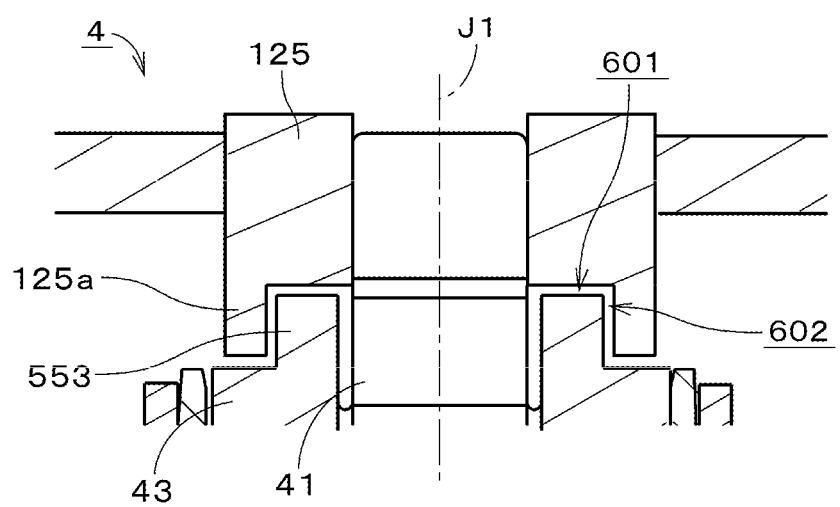
FIG. 34 is a vertical cross-sectional view illustrating a bearing mechanism according to yet another preferred embodiment of the present invention.

FIG. 34 is a diagram illustrating a bearing mechanism 4 according to yet another preferred embodiment of the present invention. The bushing 125 includes an outer annular portion 125a arranged to project downward defined in an outer edge portion of a bottom portion thereof. The sleeve 43 includes an inner annular portion 553 arranged to project upward around the shaft 41. A portion of the lower surface of the bushing 125 which is radially inward of the outer annular portion 125a and an upper surface of the inner annular portion 553 together define a horizontal gap 601 arranged to extend radially outward therebetween. An inner circumferential surface of the outer annular portion 125a and an outer circumferential surface of the inner annular portion 553 together define a vertical gap 602 arranged to extend in the axial direction and being annular in shape and centered on the central axis J1. Provision of the horizontal gap 601 and the vertical gap 602 contributes to reducing evaporation of the lubricating oil 46 out of the bearing mechanism 4.

While preferred embodiments of the present invention have been described above, it will be understood that the present invention is not limited to the above-described preferred embodiments, and a variety of modifications are possible. For example, the thrust cap 44 may not necessarily be axially opposed to the entire thrust plate 42 according to modifications of the above-described preferred embodiments. The lower minute gap 66 can be defined properly only if the thrust cap 44 is axially opposed to at least the outer circumferential portion 424 of the thrust plate 42. The oil-repellent film 443 may be arranged on a portion of the upper surface 446 of the thrust cap 44 which extends from the lower minute gap 66 to the through hole 442 or 442a according to modifications of the above-described preferred embodiments. In this case, a leakage of the lubricating oil 46 through the lower minute gap 66 can be prevented more securely. A method of injecting the lubricating oil 46 into the bearing mechanism 4 through the through hole 442 of the thrust cap 44 may be employed for the bearing mechanism 4 which includes the sleeve 43 impregnated with the lubricating oil 46.

The inner circumferential surface 50 of the bearing housing 311 may be arranged to include an inclined surface arranged to be inclined radially inward with decreasing height, with the first seal gap 61 defined between the inclined surface and the outer circumferential surface 431 of the sleeve 43, according to modifications of the above-described preferred embodiments. The top plate portion and the side wall portion of the cup 121 of the impeller 12 may be made of a metal and a resin, respectively, according to modifications of the above-described preferred embodiments. The yoke 21 may be arranged substantially in the shape of a covered cylinder according to modifications of the above-described preferred embodiments.

The motor 11 may be used in disk drive apparatuses, such as hard disk drives and optical disk drives, or other types of electronic devices, instead of fans.

Features of the above-described preferred embodiments and the modifications thereof may be combined appropriately as long as no conflict arises.

The present invention is applicable to motors installed in fans, and also to motors for use in other types of devices.

What is claimed is:

1. A motor comprising:
a stationary portion including a stator; and
a rotating portion including a rotor magnet arranged opposite to the stator;
wherein a bearing mechanism is arranged in the stationary portion and the rotating portion such that the rotating portion is rotatable with respect to the stationary portion;
wherein the bearing mechanism includes:
a shaft;
a sleeve portion arranged to have the shaft inserted therein;
a thrust plate fixed to the shaft on a lower side of the sleeve portion, and including an outer circumferential surface having a diameter greater than that of a bottom portion of the sleeve portion;
a bearing housing arranged to surround the sleeve portion and the thrust plate; and
a cap member fixed to the bearing housing and being axially opposed to at least a lower side of an outer circumferential portion of the thrust plate;
a radial dynamic pressure bearing portion arranged to support the shaft in a radial direction defined therein includes a radial gap defined between an inner circumferential surface of the sleeve portion and an outer circumferential surface of the shaft, while a thrust dynamic pressure bearing portion defined therein includes a thrust gap defined between a lower surface of the sleeve portion and an upper surface of the thrust plate;
an outer circumferential surface of the sleeve portion and an inner circumferential surface of the bearing housing are arranged to together define a first seal gap therebetween, the first seal gap having a radial width gradually increasing with increasing distance from the thrust plate, the first seal gap including a first seal portion having a surface of a lubricating oil defined therein;
a side communicating channel arranged to bring a bottom portion of the first seal gap and an outer edge portion of the thrust gap into communication with each other is defined on a lower side of the first seal portion and either between an outer circumferential portion of the sleeve portion and an inner circumferential portion of the bearing housing, or in the outer circumferential portion of the sleeve portion; and
the outer circumferential surface of the thrust plate and the inner circumferential surface of the bearing housing are arranged to together define a side gap therebetween, and a lower surface of the outer circumferential portion of the thrust plate and an upper surface of an outer circumferential portion of the cap member are arranged to together define a lower gap therebetween, the side gap and the lower gap together constituting a second seal gap, the second seal gap including a second seal portion having another surface of the lubricating oil defined therein.

2. The motor according to claim 1, wherein
the outer circumferential portion of one of the thrust plate and the cap member includes an annular projecting portion arranged to project toward the other one of the thrust plate and the cap member; and
the lower gap is defined between the annular projecting portion and the other one of the thrust plate and the cap member.

3. The motor according to claim 2, wherein the lower gap is located axially below the side communicating channel.

4. The motor according to claim 2, wherein a width of a gap defined between the thrust plate and the cap member is arranged to gradually increase radially inward from the lower gap.

5. The motor according to any one of claims 1 to 4, wherein the cap member includes a through hole arranged to extend therethrough in an axial direction, and arranged radially inward of the lower gap.

6. The motor according to claim 5, further comprising an oil-repellent film arranged on an inner circumferential surface of the through hole.

7. The motor according to claim 5, wherein a diameter of the through hole is arranged to gradually decrease with increasing height.

8. The motor according to claim 1, wherein
one of the lower surface of the sleeve portion and the upper surface of the thrust plate includes a thrust dynamic pressure groove array defined therein, the thrust dynamic pressure groove array including a plurality of grooves each arranged substantially in a shape of a letter "V" and each having a top portion thereof oriented in a circumferential direction; and
a radially inner portion of each of the grooves is arranged to have a length greater than that of a radially outer portion of the groove.

9. The motor according to claim 1, wherein one of the bottom portion of the sleeve portion and a top portion of the thrust plate includes a lower communicating channel arranged to bring the outer edge portion and an inner edge portion of the thrust gap into radial communication with each other.

10. The motor according to claim 9, wherein
the sleeve portion includes:
a sleeve arranged to have the shaft inserted therein; and
a lower plate arranged on a lower surface of the sleeve;
the lower surface of the sleeve includes a lower-side groove portion arranged to extend in the radial direction; and
the lower-side groove portion serves as the lower communicating channel.

11. The motor according to claim 1, wherein
the bearing housing includes a contact portion arranged to be in contact with a top portion of the sleeve portion; and
the contact portion and the top portion of the sleeve portion are arranged to together define an airway arranged therebetween to bring the first seal gap and a space above the sleeve portion into communication with each other.

12. The motor according to claim 1, wherein a top portion of the sleeve portion includes an upper communicating channel arranged to bring the first seal gap and the radial gap into communication with each other.

13. The motor according to claim 12, wherein
the sleeve portion includes:
a sleeve arranged to have the shaft inserted therein; and
an upper plate arranged on an upper surface of the sleeve;
the upper surface of the sleeve includes an upper-side groove portion arranged to extend in the radial direction; and
the upper-side groove portion serves as the upper communicating channel.

14. The motor according to claim 1, wherein
the side communicating channel is defined between the outer circumferential portion of the sleeve portion and the inner circumferential portion of the bearing housing; and
the outer circumferential portion of the sleeve portion and the inner circumferential portion of the bearing housing are arranged to together define another side communicating channel having a radial width greater than that of the side communicating channel therebetween.

15. The motor according to claim 1, wherein
the side communicating channel is defined between the outer circumferential portion of the sleeve portion and the inner circumferential portion of the bearing housing; and
the outer circumferential portion of the sleeve portion and the inner circumferential portion of the bearing housing are arranged to together define a plurality of side communicating channels having different distances from a central axis therebetween.

16. The motor according to claim 1, further comprising a bushing arranged above the radial gap, and fixed to a top portion of the shaft; wherein
an inner or outer circumferential surface of the bushing and an outer or inner circumferential surface of one of the bearing housing and the sleeve portion are arranged to together define a vertical gap therebetween, the vertical gap being annular in shape and centered on a central axis and arranged to extend in an axial direction;
a lower surface of the bushing and an upper surface of one of the bearing housing and the sleeve portion are arranged to together define a horizontal gap arranged to extend radially outward therebetween; and
the radial gap is arranged to be in communication with an exterior space through the horizontal gap and the vertical gap.

17. A fan comprising:
the motor of claim 1; and
an impeller fixed to the shaft, and arranged to rotate through the motor.

* * * * *